US010649244B1

(12) United States Patent
Mentovich et al.

(10) Patent No.: US 10,649,244 B1
(45) Date of Patent: May 12, 2020

(54) SILICON-GERMANIUM OPTICAL MODULATOR STRUCTURE FOR USE WITH OPTICAL CHIPS

(71) Applicant: Mellanox Technologies Silicon Photonics Inc., Monterey Park, CA (US)

(72) Inventors: Elad Mentovich, Tel Aviv (IL); Dimitrios Kalavrouziotis, Papagou (GR); Mehdi Asghari, La Canada (CA); Joan Fong, San Marino, CA (US); Wei Liu, Mountain View, CA (US); Wei Qian, Torrance, CA (US); Dazeng Feng, El Monte, CA (US)

(73) Assignee: MELLANOX TECHNOLOGIES SILICON PHOTONICS INC., Monterey Park, CA (US)

( * ) Notice: Subject to any disclaimer, the term of this patent is extended or adjusted under 35 U.S.C. 154(b) by 0 days.

(21) Appl. No.: 16/368,628

(22) Filed: Mar. 28, 2019

(30) Foreign Application Priority Data

Mar. 14, 2019 (GR) .............................. 20190100121

(51) Int. Cl.
*G02F 1/017* (2006.01)
*G02F 1/015* (2006.01)

(52) U.S. Cl.
CPC ...... *G02F 1/017* (2013.01); *G02F 2001/0157* (2013.01); *G02F 2201/063* (2013.01); *G02F 2202/108* (2013.01)

(58) Field of Classification Search
CPC ............... G02F 1/017; G02F 2201/063; G02F 2202/108; G02F 2001/0157
See application file for complete search history.

(56) References Cited

U.S. PATENT DOCUMENTS

| 6,403,975 | B1 * | 6/2002 | Brunner ................. B82Y 20/00 257/103 |
| 7,394,948 | B1 | 7/2008 | Zheng et al. |
| 7,394,949 | B1 | 7/2008 | Feng et al. |
| 7,652,630 | B2 | 1/2010 | Rosenberger et al. |
| 8,090,231 | B1 | 1/2012 | Asghari et al. |
| 8,638,485 | B2 | 1/2014 | Feng et al. |
| 8,724,100 | B1 | 5/2014 | Asghari et al. |
| 8,897,606 | B2 | 11/2014 | Asghari et al. |
| 9,379,515 | B1 | 6/2016 | Asghari et al. |
| 9,778,494 | B1 * | 10/2017 | Feng ........................ G02F 1/025 |
| 10,031,355 | B2 * | 7/2018 | Feng ....................... G02F 1/0147 |
| 2009/0310901 | A1 | 12/2009 | Dong |
| 2011/0142390 | A1 | 6/2011 | Feng et al. |
| 2011/0206313 | A1 | 8/2011 | Dong et al. |

(Continued)

OTHER PUBLICATIONS

Dong et al., U.S. Appl. No. 12/228,671, filed Aug. 13, 2008.

*Primary Examiner* — Andrew Jordan
(74) *Attorney, Agent, or Firm* — Kligler & Associates Patent Attorneys Ltd

(57) ABSTRACT

The optical device includes a waveguide positioned on a base and a modulator positioned on the base. The modulator includes a ridge that includes $Si_{1-x}Ge_x$ where x is greater than or equal to 0.4 and less than or equal to 0.8. The modulator is configured to guide a light signal through the modulator such that the light signal contacts the $Si_{1-x}Ge_x$. A local heater is configured to heat the modulator.

19 Claims, 14 Drawing Sheets

(56) References Cited

U.S. PATENT DOCUMENTS

| | | |
|---|---|---|
| 2013/0094074 A1 | 4/2013 | Asghari et al. |
| 2013/0294472 A1 | 11/2013 | Feng et al. |
| 2014/0105239 A1 | 4/2014 | Asghari et al. |
| 2017/0269391 A1* | 9/2017 | Feng .................. G02F 1/025 |
| 2018/0067344 A1* | 3/2018 | Feng .................. G02F 1/025 |

* cited by examiner

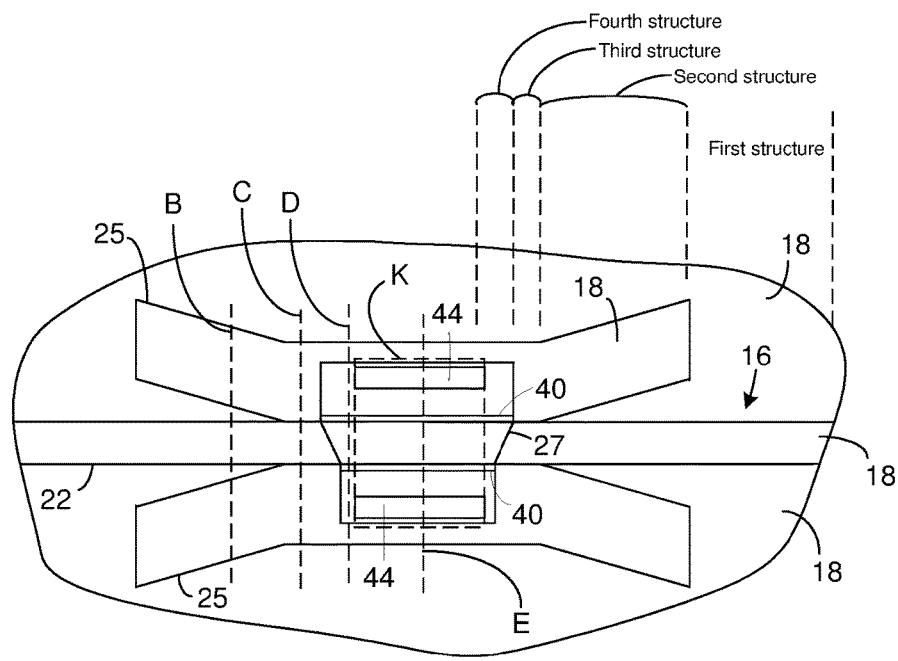
Figure 2A
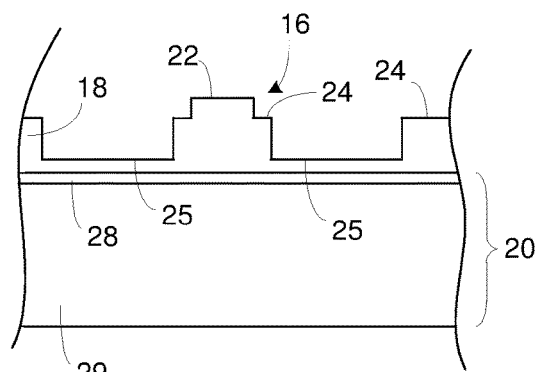
Figure 2B
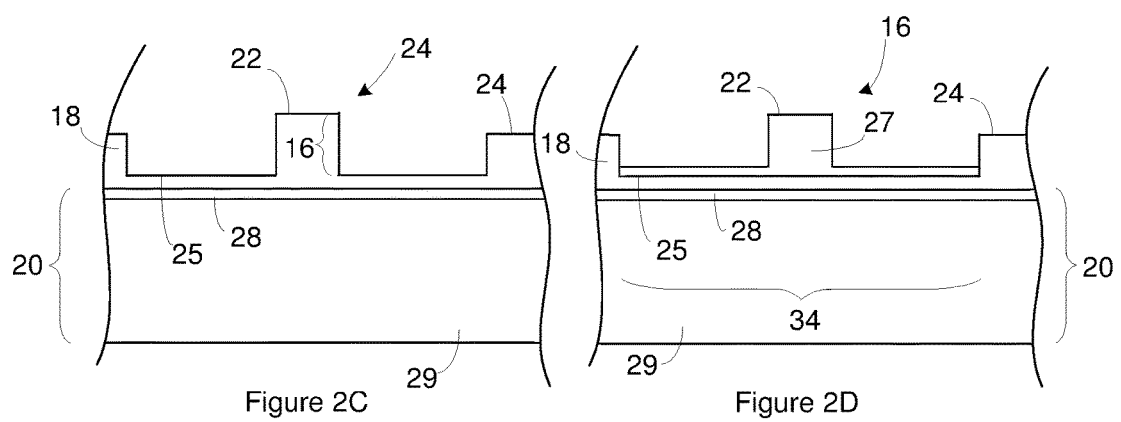
Figure 2C
Figure 2D

US 10,649,244 B1

SILICON-GERMANIUM OPTICAL MODULATOR STRUCTURE FOR USE WITH OPTICAL CHIPS

FIELD

The present invention relates to optical devices and particularly, to optical modulators.

BACKGROUND

Satisfying IEEE 802.3 standard for optical communications up to 2 km generally requires the ability to modulate light signals having wavelengths around 1310 nm. Planar optical devices are one platform for implementing these standards. These platforms often have single mode waveguides with dimensions on the order of several microns. However, a commercially viable electroabsorption modulator that has these waveguide dimensions and satisfies these standards has yet to be built on these platforms. For instance, some materials that can be used in these platforms have shown the ability to modulate the light signals but have shown impractically low levels of absorption. As a result, there is a need to an improved modulator.

SUMMARY

The optical device includes a waveguide positioned on a base and a modulator positioned on the base. The modulator includes a ridge of an electro-absorption medium having a top side and a lateral side. The lateral side is between the top side and the base and the top side has a width. The waveguide is configured to guide a light signal through the modulator such that the light signal is guided through the ridge of electro-absorption medium. A heater is positioned over the lateral side of the electro-absorption medium without being positioned over the entire width of the ridge.

Another embodiment of the optical device includes a waveguide positioned on a base and a modulator positioned on the base. The modulator includes a ridge of an electro-absorption medium. The waveguide is configured to guide a light signal through the modulator such that the light signal is guided through the ridge of the electro-absorption medium. A device ridge includes the ridge of the electro-absorption medium. The device ridge has lateral sides that extend upward from a lower inside corner to a top side. The laterals sides are between the top side and the base. A heater is positioned over one of the lateral side of the device ridge and extends down to the lower inside corner of the device ridge.

Another embodiment of the device includes a waveguide positioned on a base and a modulator positioned on the base. The modulator includes a ridge that includes a quantum well structure that includes multiple layers. The layers include one or more wells and two or more potential barriers arranged such that wells alternate with potential barriers. In some instances, the ridge includes $Si_{1-x}Ge_x$ where x is greater than or equal to 0.4 and less than or equal to 0.8. The modulator is configured to guide a light signal through the modulator such that the light signal is guided through the $Si_{1-x}Ge_x$. A local heater is configured to heat the modulator. In some instances, a device ridge includes the ridge. The device ridge has a top side and lateral sides. The lateral sides are between the top side and the base and the top side has a width. A heater can be positioned over one of the lateral sides and the top side of the device ridge without being positioned over the entire width of the top side.

Another embodiment of the device includes a waveguide positioned on a base and a modulator positioned on the base. The modulator is a Quantum-Confined Stark Effect (QCSE) electro-absorption modulator that includes a ridge having a quantum well structure that includes multiple layers. The layers include one or more wells and two or more potential barriers arranged such that wells alternate with potential barriers. In some instances, the ridge includes $Si_{1-x}Ge_x$ where x is greater than or equal to 0.4 and less than or equal to 0.8. The modulator is configured to guide a light signal through the modulator such that the light signal contacts the $Si_{1-x}Ge_x$.

A method of fabricating a modulator includes growing a seed layer on a base such that a surface of the seed layer has a root mean square roughness less than 1 nm. The method can also include growing a quantum well structure on the surface of the seed layer. The quantum well structure includes multiple layers. The layers include one or more wells and two or more potential barriers arranged such that wells alternate with potential barriers. In some instances, the ridge includes $Si_{1-x}Ge_x$ where x is greater than or equal to 0.4 and less than or equal to 0.8. In one example, the portion of the quantum well structure that contacts the surface is epitaxially grown in a chamber at a pressure of 20 to 60 Torr and/or at a temperature of 500 to 900 degrees.

A method of fabricating a modulator includes growing a quantum well structure on a base. The quantum well structure includes $Si_{1-x}Ge_x$ where x is greater than or equal to 0.4 and less than or equal to 0.8. The method also includes growing the quantum well structure at a temperature of 500 to 900 degrees. In some instances, the quantum well structure alternates wells with potential barriers where the wells are Ge and the potential barriers the $Si_{1-x}Ge_x$.

BRIEF DESCRIPTION OF THE FIGURES

FIG. 1A is a perspective view of the device.

FIG. 1B is a cross section of the device taken along the line labeled B in FIG. 1A.

FIG. 2A through FIG. 2E illustrate construction of a modulator that is suitable for use as the modulator of FIG. 1A. FIG. 2A is a topview of the portion of the optical device shown in FIG. 1A that includes the optical modulator.

FIG. 2B is a cross-section of the optical device shown in FIG. 2A taken along the line labeled B.

FIG. 2C is a cross-section of the optical device shown in FIG. 2A taken along the line labeled C.

FIG. 2D is a cross-section of the optical device shown in FIG. 2A taken along the line labeled D.

FIG. 2E is a cross-section of the optical device shown in FIG. 2A taken along the line labeled E.

FIG. 4A is a cross-section of the portion of the device that includes a modulator.

FIG. 4B is a cross-section of the portion of the device that includes another embodiment of a modulator.

FIG. 4C is a cross section of a portion of the quantum well structure in the device of FIG. 4A and/or FIG. 4B.

FIG. 5A is a topview of a portion of an optical device that includes an optical modulator.

FIG. 5B is a cross-section of the optical device shown in FIG. 5A taken along the line labeled B.

FIG. 5C is a cross-section of the optical device shown in FIG. 5A taken along the line labeled C.

FIG. 5D is a cross-section of the optical device shown in FIG. 5A taken along the line labeled D.

FIG. 6A is a topview of the portion of the device that includes the modulator.

FIG. 6B is a cross section of the modulator shown in FIG. 6A taken along the line labeled B in FIG. 6A.

FIG. 6C is a cross section of the modulator shown in FIG. 6A taken along the line labeled C in FIG. 6A.

FIG. 8B is a cross section of the device shown in FIG. 8A taken along the line labeled B in FIG. 8A.

FIG. 9A is a topview of the device.

FIG. 9B is a cross section of the device shown in FIG. 9A taken along the line labeled B in FIG. 9A FIG. 10A and FIG. 10B illustrate the device of FIG. 9A and FIG. 9B modified so as to include thermal conductors.

DESCRIPTION

A device includes a waveguide positioned on a base and a modulator positioned on the base. The modulator is a Quantum-Confined Stark Effect (QCSE) electro-absorption modulator. The modulator includes a quantum well structure that includes multiple layers. The layers include one or more wells and two or more potential barriers arranged such that wells alternate with potential barriers. In some instances, the potential barriers includes $Si_{1-x}Ge_x$ where x is greater than or equal to 0.4 and/or less than or equal to 0.8. The modulator is configured to guide a light signal through the modulator such that the light signal contacts the $Si_{1-x}Ge_x$. The modulator provides higher levels of absorption of 1310 nm light than was achieved with bulk materials. As a result, the modulator is a commercially viable modulator of 1310 nm light that can be constructed on planar optical device platforms.

It was previously believed that the disclosed structure could not be built because the silicon and germanium in the different layers of the quantum well structure would diffuse as a result of the growth and/or annealing the device (non Srantski-Krastanov islanding). This diffusion would cause the quantum well structure to behave as a bulk semiconductor. Since these bulk semiconductors have unacceptably low levels of absorption, it was believed these structures would result in a modulator that would also have low absorption levels. However, the inventors have surprisingly found that the growth conditions can be tuned so as to achieve the desired results without diffusion of the silicon and germanium.

Figure 1A:
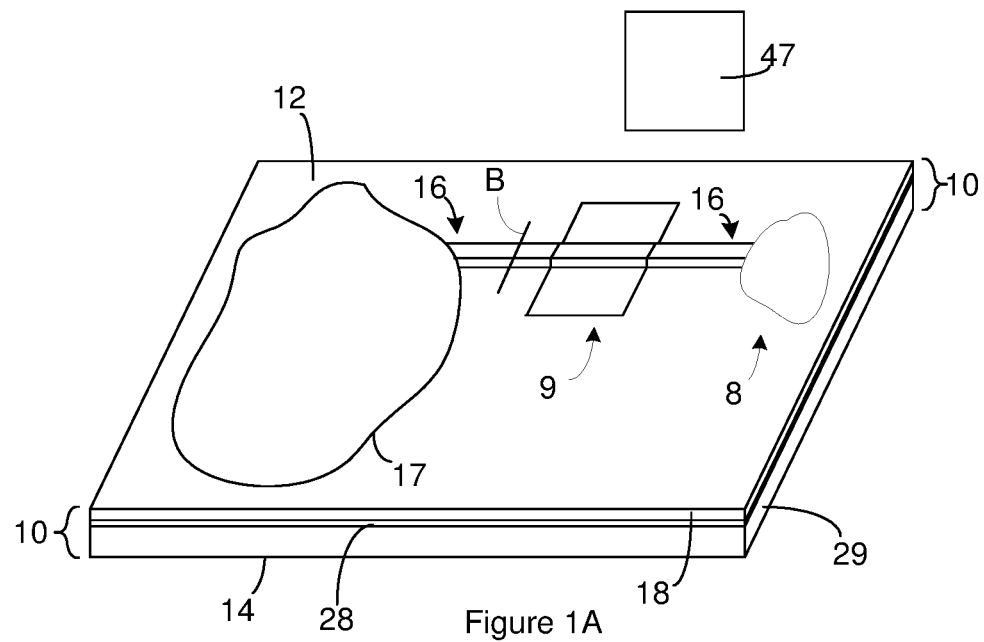
FIG. 1A and FIG. 1B illustrates an optical device having a waveguide that guides a light signal between a light source and a modulator.
Figure 1B:
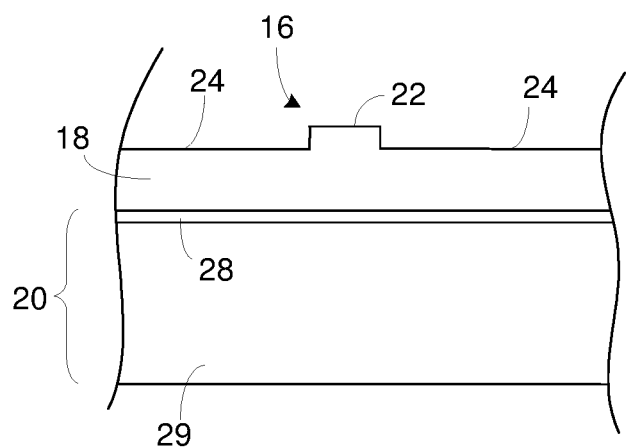

FIG. 1A and FIG. 1B illustrate an optical device having a waveguide that guides a light signal between a light source 8 and a modulator 9. FIG. 1A is a perspective view of the device. FIG. 1B is a cross section of the device taken along the line labeled B in FIG. 1A. FIG. 1A and FIG. 1B do not show details of either the light source 8 or the modulator but illustrates the relationship between these components and the waveguide.

The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 10 (or edges) extending from a top side 12 to a bottom side 14. The propagation direction of light signals along the length of the waveguides on a planar optical device generally extends through the lateral sides 10 of the device. The top side 12 and the bottom side 14 of the device are non-lateral sides.

The device includes one or more waveguides 16 that carry light signals to and/or from optical components 17. Examples of optical components 17 that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act as a source of a light signal, amplifiers for amplifying the intensity of a light signal, attenuators for attenuating the intensity of a light signal, modulators for modulating a signal onto a light signal, modulators that convert a light signal to an electrical signal, and vias that provide an optical pathway for a light signal traveling through the device from the bottom side 14 of the device to the top side 12 of the device. Additionally, the device can optionally, include electrical components. For instance, the device can include electrical connections for applying a potential or current to a waveguide and/or for controlling other components on the optical device.

A portion of the waveguide includes a first structure where a portion of the waveguide 16 is defined in a light-transmitting medium 18 positioned on a base 20. For instance, a portion of the waveguide 16 is partially defined by a ridge 22 extending upward from a slab region of the light-transmitting medium as shown in FIG. 1B. In some instances, the top of the slab region is defined by the bottom of trenches 24 extending partially into the light-transmitting medium 18 or through the light-transmitting medium 18. Suitable light-transmitting media include, but are not limited to, silicon, polymers, silica, SiN, GaAs, InP and $LiNbO_3$.

The portion of the base 20 adjacent to the light-transmitting medium 18 is configured to reflect light signals from the waveguide 16 back into the waveguide 16 in order to constrain light signals in the waveguide 16. For instance, the portion of the base 20 adjacent to the light-transmitting medium 18 can be a light insulator 28 with a lower index of refraction than the light-transmitting medium 18. The drop in the index of refraction can cause reflection of a light signal from the light-transmitting medium 18 back into the light-transmitting medium 18. The base 20 can include the light insulator 28 positioned on a substrate 29. As will become evident below, the substrate 29 can be configured to transmit light signals. For instance, the substrate 29 can be constructed of a light-transmitting medium 18 that is different from the light-transmitting medium 18 or the same as the light-transmitting medium 18. In one example, the device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate. The layer of silica can serving as the light insulator 28 and the silicon substrate can serve as the substrate 29.

Although the light source 8 is shown positioned centrally on the device, the light source 8 can be positioned at the edge of the device. The light source 8 can be any type of light source including light sources that convert electrical energy into light. Examples of suitable light sources include, but are not limited to, a semiconductor laser, and a semiconductor amplifier such as a reflection semiconducting optical amplifier (RSOA) forming a laser cavity with an external reflection grating. Examples of suitable lasers include, but are not limited to, Fabry-Perot lasers, Distributed Bragg Reflector lasers (DBR lasers), Distributed FeedBack lasers (DFB lasers), external cavity lasers (ECLs). A variety of suitable lasers and laser constructions are disclosed in light source applications including U.S. patent application Ser. No. 13/385,774, filed on Mar. 5, 2012, and entitled "Integration of Components on Optical Device;" U.S. patent application Ser. No. 14/048,685, filed on Oct. 8, 2013, and entitled "Use of Common Active Materials in Optical Components;" U.S. Provisional Patent Application Ser. No. 61/825,501, filed on May 20, 2013, and entitled "Reducing Power Requirements for Optical Links;" U.S. patent application Ser. No. 13/694,047, filed on Oct. 22, 2012, and entitled "Wafer Level Testing of Optical Components;" U.S. patent application Ser. No. 13/506,629, filed on May 2, 2012, and entitled "Integration of Laser into Optical Platform;" U.S. patent application Ser. No. 13/573,892, filed on Oct. 12, 2012, and entitled "Reduction of Mode Hopping in a Laser Cavity;" U.S. patent application Ser. No. 13/317,340, filed on Oct. 14, 2011, and entitled "Gain Medium Providing Laser and Amplifier Functionality to Optical Device;" U.S. patent application Ser. No. 13/385,275, filed on Feb. 9, 2012, and entitled "Laser Combining Light Signals from Multiple Laser Cavities;" each of which is incorporated herein in its entirety. The light source 8 can be constructed as disclosed in any one or more of the light source applications and/or can be interfaced with the device as disclosed in any one or more of the light source applications. Other suitable light sources include interdevice waveguides that carry a light signal to the device from another device such as an optical fiber. A variety of interfaces between an optical fiber and a device constructed according to FIG. 1A and FIG. 1B are disclosed in fiber interface patents applications including U.S. patent application Ser. No. 12/228,007, filed on Nov. 14, 2008, and entitled "Optical System Having Optical Fiber Mounted to Optical Device," now abandoned; and U.S. patent application Ser. No. 12/148,784, filed on Apr. 21, 2008, entitled "Transfer of Light Signals Between Optical Fiber and System Using Optical Devices with Optical Vias," and issued as U.S. Pat. No. 8,090,231; each of which is incorporated herein in its entirety. The light source 8 can an optical fiber interfaced with a device as disclosed in any one or more of the fiber interface patents applications. In some instances, the device does not include a light source. For instance, the waveguide can terminate at a facet located at or near the perimeter of the device and a light signal traveling through air can then be injected into the waveguide through the facet. Accordingly, the light source is optional.

Figure 2E:
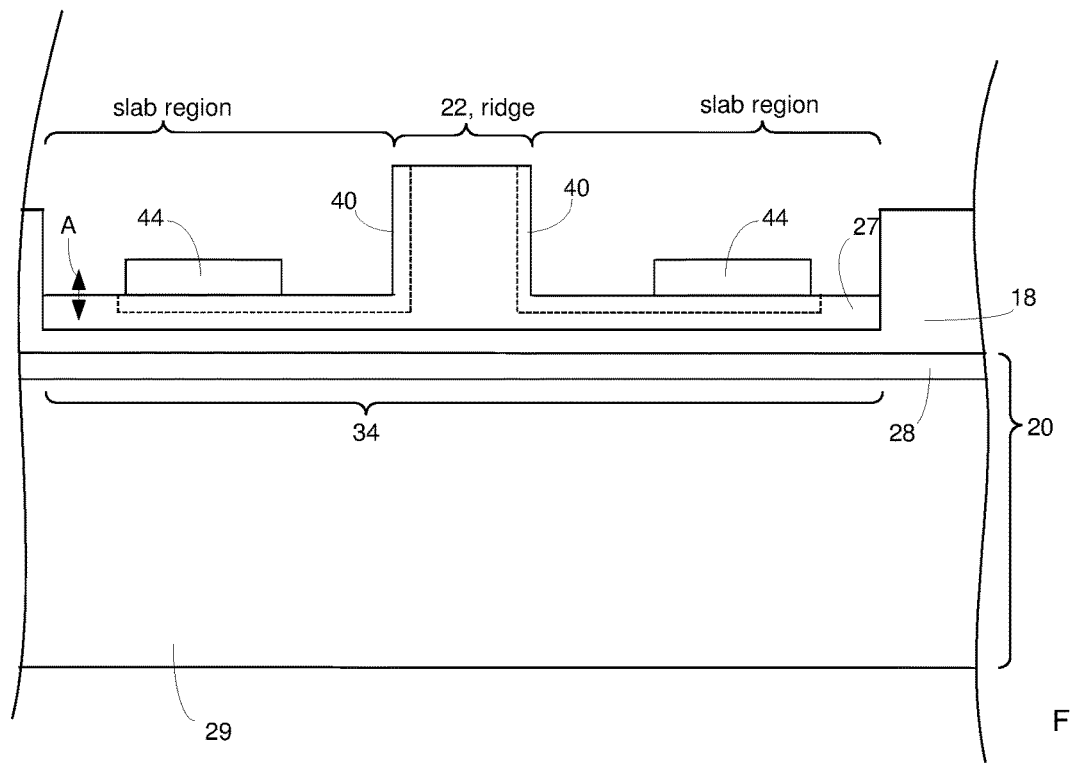

FIG. 2A through FIG. 2E illustrate construction of a modulator that is suitable for use as the modulator of FIG. 1A. FIG. 2A is a topview of the portion of the optical device shown in FIG. 2A that includes an optical modulator. FIG. 2B is a cross-section of the optical device shown in FIG. 2A taken along the line labeled B. FIG. 2C is a cross-section of the optical device shown in FIG. 2A taken along the line labeled C. FIG. 2D is a cross-section of the optical device shown in FIG. 2A taken along the line labeled D. FIG. 2E is a cross-section of the optical device shown in FIG. 2A taken along the line labeled E.

Recesses 25 (FIG. 2A) extend into the slab regions such that the ridge 22 is positioned between recesses 25. The recesses 25 can extend part way into the light-transmitting medium 18. As is evident from FIG. 2B, the recesses 25 can be spaced apart from the ridge 22. As a result, a portion of the waveguide 16 includes a second structure where an upper portion of the waveguide 16 is partially defined by the ridge 22 extending upward from the slab region and a lower portion of the waveguide is partially defined by recesses 25 extending into the slab regions and spaced apart from the ridge.

As shown in FIG. 2C, the recesses 25 can approach the ridge 22 such that the sides of the ridge 22 and the sides of the recesses 25 combine into a single surface 26. As a result, a portion of a waveguide includes a third structure where the waveguide is partially defined by the surface 26.

As is evident in FIG. 2A, a portion of the waveguide 16 includes an electro-absorption medium 27. The electro-absorption medium 27 is configured to receive the light signals from a portion of the waveguide having the third structure and to guide the received light signals to another portion of the waveguide having the third structure.

In FIG. 2D, a ridge 22 of electro-absorption medium 27 extends upward from a slab region of the electro-absorption medium 27. Accordingly, a portion of a waveguide includes a fourth structure configured to guide the received light signal through the electro-absorption medium 27. This portion of the waveguide is partially defined by the top and lateral sides of the electro-absorption medium 27. The slab regions of the electro-absorption medium 27 and the ridge 22 of the electro-absorption medium 27 are both positioned on a seed portion 34 of the light-transmitting medium 18. As a result, the seed portion 34 of the light-transmitting medium 18 is between the electro-absorption medium 27 and the base 20. In some instances, when the light signal travels from the light-transmitting medium into the electro-absorption medium 27, a portion of the light signal enters the seed portion 34 of the light-transmitting medium 18 and another portion of the light signal enters the electro-absorption medium 27. As described above, the electro-absorption medium 27 can be grown on the seed portion of the light-transmitting medium 18. The seed layer is optional. For instance, the electro-absorption medium 27 can be grown or otherwise formed directly on the seed portion of the light-transmitting medium 18

As is evident in FIG. 2A, there is an interface between each facet of the electro-absorption medium 27 and a facet of the light-transmitting medium 18. The interface can have an angle that is non-perpendicular relative to the direction of propagation of light signals through the waveguide 16 at the interface. In some instances, the interface is substantially perpendicular relative to the base 20 while being non-perpendicular relative to the direction of propagation. The non-perpendicularity of the interface reduces the effects of back reflection. Suitable angles for the interface relative to the direction of propagation include but are not limited to, angles between 80° and 89°, and angles between 80° and 85°.

The optical device includes a modulator. The location of the modulator on the optical device is illustrated by the line labeled K in FIG. 2A. In order to simplify FIG. 2A, the details of the modulator construction are not shown in FIG. 2A. However, the modulator construction is evident from other illustrations such as FIG. 2E. The modulator of FIG. 2E is constructed on the portion of the waveguide having a fourth structure constructed according to FIG. 2D. The perimeter of portions of doped regions shown in FIG. 2E are illustrated with dashed lines to prevent them from being confused with interfaces between different materials. The interfaces between different materials are illustrated with solid lines. The modulator is configured to apply an electric field to the electro-absorption medium 27 in order to phase and/or intensity modulate the light signals received by the modulator.

A ridge 22 of the electro-absorption medium 27 extends upward from a slab region of the electro-absorption medium 27. Doped regions 40 are both in the slab regions of the electro-absorption medium 27 and also in the ridge of the electro-absorption medium 27. For instance, doped regions 40 of the electro-absorption medium 27 are positioned on the lateral sides of the ridge 22 of the electro-absorption medium 27. In some instances, each of the doped regions 40 extends up to the top side of the electro-absorption medium 27 as shown in FIG. 2E. Additionally, the doped regions 40 extend away from the ridge 22 into the slab region of the electro-absorption medium 27. The transition of a doped region 40 from the ridge 22 of the electro-absorption medium 27 into the slab region of the electro-absorption medium 27 can be continuous and unbroken as shown in FIG. 2E.

Each of the doped regions 40 can be an N-type doped region or a P-type doped region. For instance, each of the N-type doped regions can include an N-type dopant and each of the P-type doped regions can include a P-type dopant. In some instances, the electro-absorption medium 27 includes a doped region 40 that is an N-type doped region and a doped region 40 that is a P-type doped region. The separation between the doped regions 40 in the electro-absorption medium 27 results in the formation of PIN (p-type region-insulator-n-type region) junction in the modulator.

In the electro-absorption medium 27, suitable dopants for N-type regions include, but are not limited to, phosphorus and/or arsenic. Suitable dopants for P-type regions include, but are not limited to, boron. The doped regions 40 are doped so as to be electrically conducting. A suitable concentration for the P-type dopant in a P-type doped region includes, but is not limited to, concentrations greater than $1 \times 10^{15}$ cm$^{-3}$, $1 \times 10^{17}$ cm$^{-3}$, or $1 \times 10^{19}$ cm$^3$, and/or less than $1 \times 10^{17}$ cm$^{-3}$, $1 \times 10^{19}$ cm$^{-3}$, or $1 \times 10^{21}$ cm$^{-3}$. A suitable concentration for the N-type dopant in an N-type doped region includes, but is not limited to, concentrations greater than $1 \times 10^{15}$ cm$^{-3}$, $1 \times 10^{17}$ cm$^{-3}$, or $1 \times 10^{19}$ cm$^{-3}$, and/or less than $1 \times 10^{17}$ cm$^{-3}$, $1 \times 10^{19}$ cm$^{-3}$, or $1 \times 10^{21}$ cm$^{-3}$.

Electrical conductors 44 each are positioned on one of the slab regions of the electro-absorption medium 27. In particular, each electrical conductor 44 contacts a portion of a doped region 40 that is in the slab region of the electro-absorption medium 27. Accordingly, each of the doped regions 40 is doped at a concentration that allows it to provide electrical communication between an electrical conductor 44 and one of the doped regions 40 in the electro-absorption medium 27. As a result, electrical energy can be applied to the electrical conductors 44 in order to apply an electric field to the electro-absorption medium 27. The region of the light-transmitting medium or electro-absorption medium between the doped regions can be undoped or lightly doped as long as the doping is insufficient for the doped material to act as an electrical conductor that electrically shorts the modulator.

During operation of the modulators of FIG. 1A through FIG. 2E, electronics 47 (FIG. 1A) can be employed to apply electrical energy to the electrical conductors 44 so as to form an electrical field in the electro-absorption medium 27. For instance, the electronics can form a voltage differential between the doped regions that act as a source of the electrical field in the gain medium. The electrical field can be formed without generating a significant electrical current through the electro-absorption medium 27. The electro-absorption medium 27 can be a medium in which the Franz-Keldysh effect occurs in response to the application of the electrical field. The Franz-Keldysh effect is a change in optical absorption and optical phase by an electro-absorption medium 27. For instance, the Franz-Keldysh effect allows an electron in a valence band to be excited into a conduction band by absorbing a photon even though the energy of the photon is below the band gap. To utilize the Franz-Keldysh effect the active region can have a slightly larger bandgap energy than the photon energy of the light to be modulated. The application of the field lowers the absorption edge via the Franz-Keldysh effect and makes absorption possible. The hole and electron carrier wavefunctions overlap once the field is applied and thus generation of an electron-hole pair is made possible. As a result, the electro-absorption medium 27 can absorb light signals received by the electro-absorption medium 27 and increasing the electrical field increases the amount of light absorbed by the electro-absorption medium 27. Accordingly, the electronics can tune the electrical field so as to tune the amount of light absorbed by the electro-ab sorption medium 27. As a result, the electronics can intensity modulate the electrical field in order to modulate the light signal. Additionally, the electrical field needed to take advantage of the Franz-Keldysh effect generally does not involve generation of free carriers by the electric field.

A modulator having a cross section according to FIG. 2E can be sensitive to the thickness of the slab regions of the electro-absorption medium 27. For instance, as the thickness of the slab region increases, the ridge becomes smaller and the electrical field formed between the doped regions 40 accordingly fills a smaller portion of the distance between the base 20 and the top of the ridge. For instance, the location of the electrical field effectively moves upwards from the base 20. The increased space between the electrical field and the base 20 can be thought of as increasing the resistance or carrier diffusion time of the modulator. This increase in resistance and/or diffusion time decreases the speed of the modulator. Problems also occur when these slab regions become undesirably thin. When these slab regions become thin, the doped regions extend down into the light-transmitting medium 18. This doping of the light-transmitting medium 18 also decreases the speed of the modulator.

Figure 3:
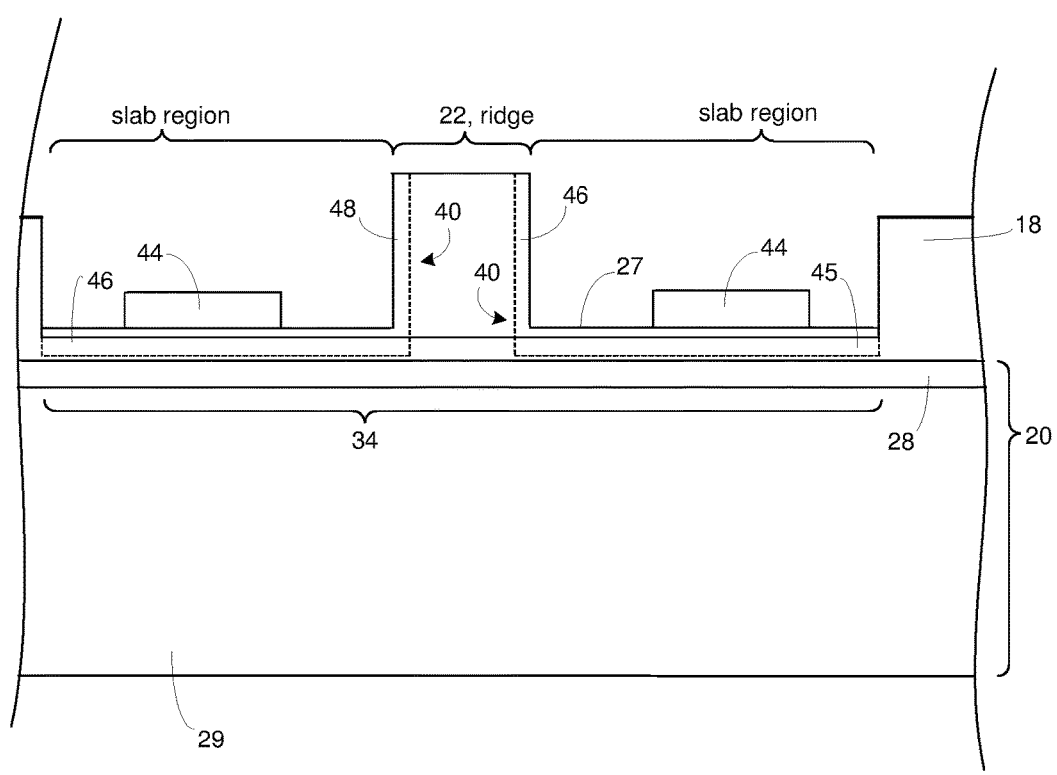
FIG. 3 is a cross section of an embodiment of a modulator having a reduced sensitivity to the thickness of the slab regions on opposing sides of a waveguide.

FIG. 3 presents an embodiment of a modulator having a reduced sensitivity to the thickness of the slab regions. The perimeter of portions of doped regions shown in FIG. 3 are illustrated with dashed lines to prevent them from being confused with interfaces between different materials. The interfaces between different materials are illustrated with solid lines. A first doped zone 45 and a second doped zone 46 combine to form each of the doped regions 40. In some instance, the first doped zone 45 is located in the light-transmitting medium 18 but not in the electro-absorption medium 27 and the second doped zone 46 is located in the electro-absorption medium 27. The first doped zone 45 can contact the second doped zone 46 or can overlap with the second doped zone 46. In some instances, the first doped zone 45 and the second doped zone 46 overlap and at least a portion of the overlap is located in the light-transmitting medium 18. In other instances, the first doped zone 45 and the second doped zone 46 overlap without any overlap being present in the electro-absorption medium 27.

The first doped zone 45 and the second doped zone 46 included in the same doped region 40 each includes the same type of dopant. For instance, the first doped zone 45 and the second doped zone 46 in an n-type doped region 40 each includes an n-type dopant. The first doped zone 45 and the second doped zone 46 included in the same doped region 40 can have the same dopant concentration or different concentrations.

Although FIG. 3 illustrates the slab regions including the electro-absorption medium 27, the slab regions of the electro-absorption medium 27 may not be present. For instance, the etch that forms the slab regions of the electro-absorption medium 27 may etch all the way through the slab regions. In these instances, the first doped zone 45 and the second doped zone 46 are both formed in the light-transmitting medium.

Although FIG. 3 shows the first doped zone 45 not extending down to the light insulator 28, the first doped zone 45 can extend down to the light insulator 28 or into the light insulator 28.

Suitable electro-absorption media 27 for use in the modulator include semiconductors. However, the light absorption characteristics of different semiconductors are different. A suitable semiconductor for use with modulators employed in communications applications includes $Ge_{1-x}Si_x$ (germanium-silicon) where x is greater than or equal to zero. In some instances, x is less than 0.05, or 0.01. Changing the variable x can shift the range of wavelengths at which modulation is most efficient. For instance, when x is zero, the modulator is suitable for a range of 1610-1640 nm. Increasing the value of x can shift the range of wavelengths to lower values. For instance, an x of about 0.005 to 0.01 is suitable for modulating in the c-band (1530-1565 nm).

Another suitable semiconductor for use as the electro-absorption media 27 in a modulator for communications applications includes $Si_{1-x}Ge_x$ where x is greater than or equal to 0.4 and less than or equal to 0.8. These modulators are suitable for modulating wavelengths in a range of 1200 nm to 1600 nm and more particularly, 1250 nm to 1350 nm. Accordingly, these modulators can satisfy the IEEE specification for optical communications up to 2 km. Changing the variable x can shift the range of wavelengths and the absorption at which modulation is most efficient. For instance, when x is 0.6, the modulator is suitable for a range of 1250-1350 nm. Increasing the value of x can shift the range of wavelengths to higher values.

When the above modulators are constructed using $Si_{1-x}Ge_x$ ($0.4 \leq x \leq 0.8$) so as to modulate wavelengths in a range 1200 nm to 1600 nm, the level of absorption may be undesirably low. The inventors have found that the low absorption levels can be overcome by constructing the modulator to include a quantum well structure constructed such that the modulator operates as a Quantum-Confined Stark Effect (QCSE) electro-absorption modulator.

Figure 4A:
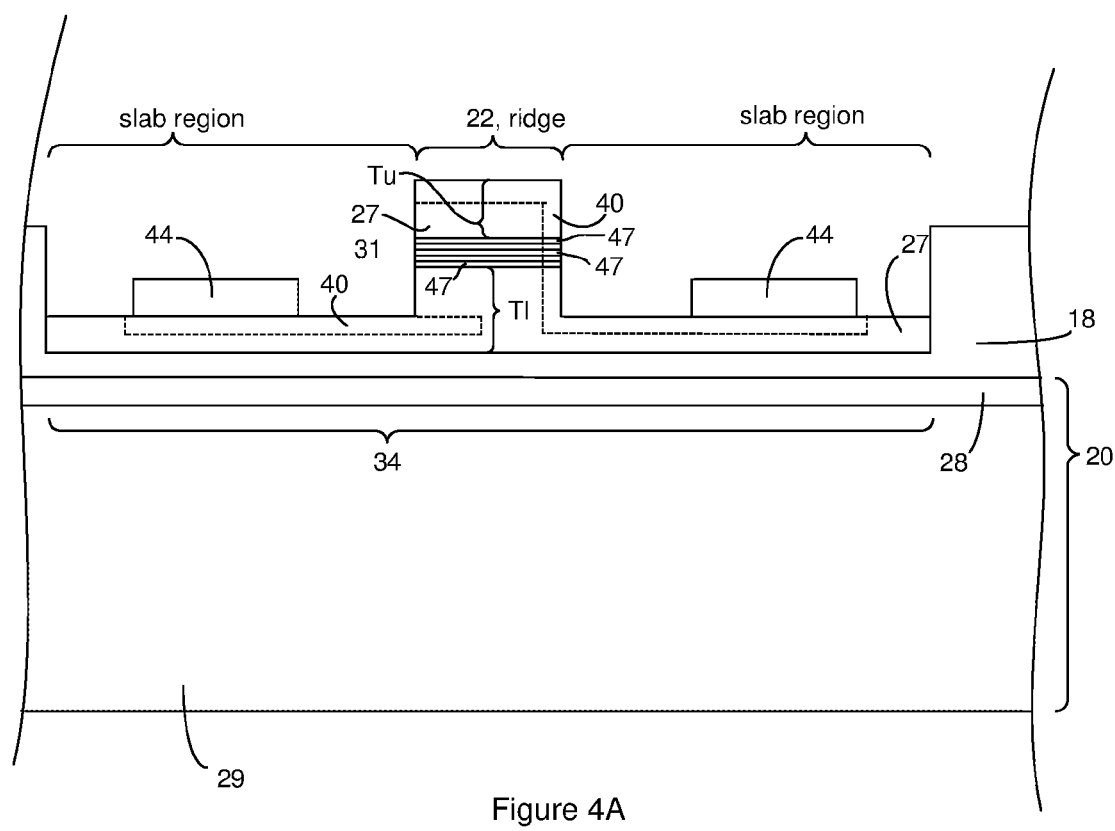
FIG. 4A through FIG. 4C illustrates examples of the modulator of FIG. 2E modified to include a quantum well structure located between layers of the electro-absorption medium.
Figure 4B:
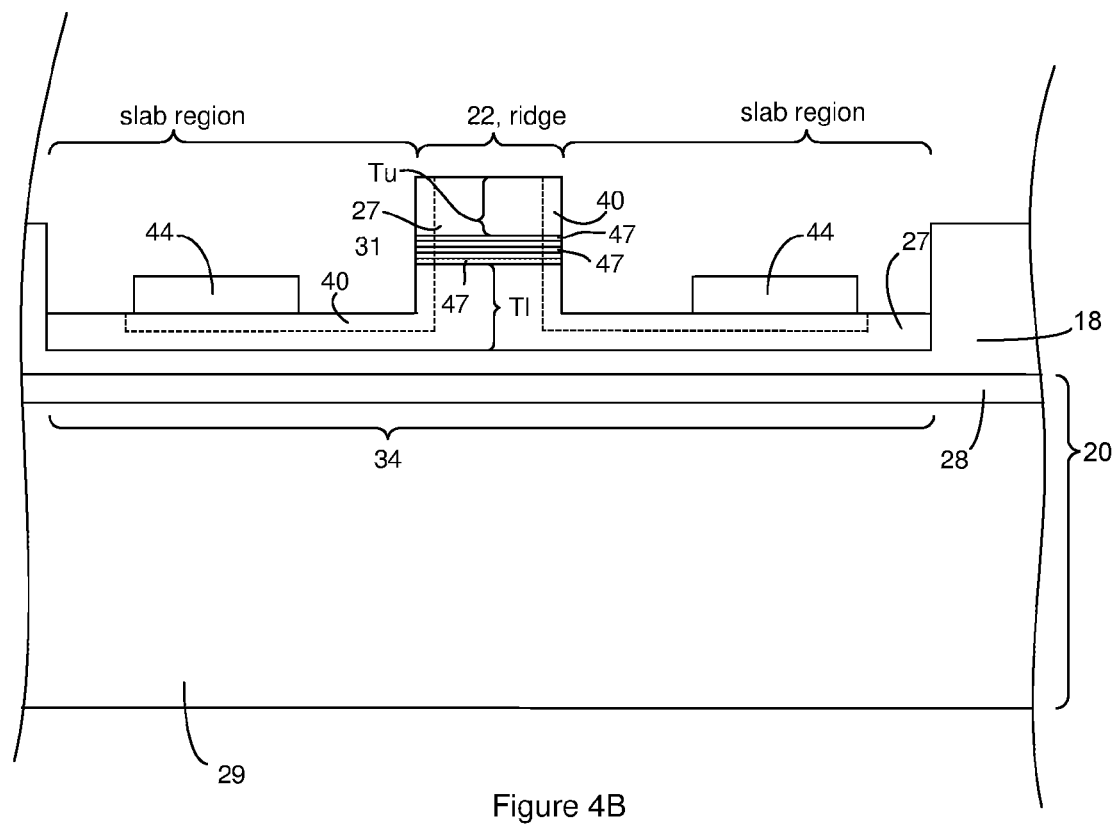
Figure 4C:
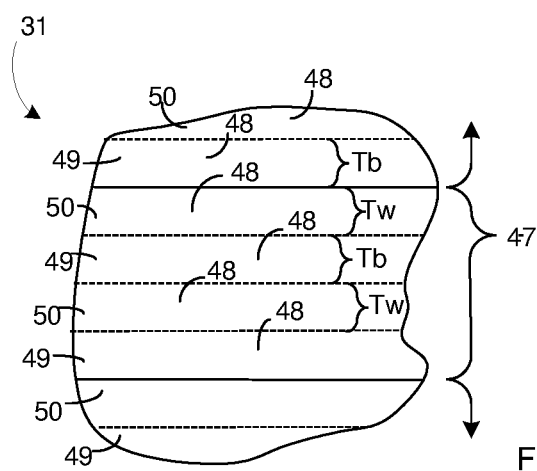

FIG. 4A and FIG. 4B illustrates examples of the modulator of FIG. 2E modified to include a Quantum Well structure 31 located between layers of the electro-absorption medium 27. The modulator of FIG. 4A includes the doped regions 40 positioned above and below the Quantum Well structure 31. The modulator of FIG. 4B includes the doped regions positioned on the lateral sides of the Quantum Well structure 31. FIG. 4C is a magnified view of a portion of the Quantum Well structure 31 of FIG. 4A and/or FIG. 4B.

The modulators of FIG. 4A and FIG. 4B are configured such that the modulator guides the light signals through the quantum well structure 31. The quantum well structure 31 includes multiple layers 47 as shown in FIG. 4A through FIG. 4C. The layers can include or consist of one or more sub-layers. For instance, the layers 47 in the quantum well structure of FIG. 4C are illustrated as including four sub-layers 48. The sub-layers 48 and the layers 47 are arranged such that the quantum well structure includes potential barriers 49 that alternate with quantum wells 50. In one example, the quantum well structure includes $Si_{1-x}Ge_x$ ($0.4 \leq x \leq 0.8$). For instance, the quantum well can be such that $Si_{1-x}Ge_x$ ($0.4 \leq x \leq 0.8$) serves as the potential barrier and $Ge_ySi_x$ where $0.9 \leq y \leq 0.99$ and $0.1 \leq x \leq 0.01$ or $0.9 \leq y \leq 1.0$ and $0.1 \leq x \leq 0.0$ serves as the quantum wells. Other suitable materials for the potential barriers include, but are not limited to, SiSn, SiGe, and GeSn.

In some instances, all or a portion of the quantum well structure is configured to have a periodic structure. For instance, the layers 47 can each have the same chemical composition. When the layers include more than one sub-layer 48, corresponding sub-layers in different layers 47 can each have the same composition. For instance, each of the quantum wells 50 can be $Si_{0.4}Ge_{0.6}$ and each of the potential barriers 49 can be Ge.

The number of layers 47 and/or the number sub-layers 48 in each layer 47 in the quantum well structure can be changed in order to tune the absorption and/or Extinction Ratio (ER) of the modulator. In some instances, the number sub-layers 48 in each layer 47 is greater than is greater than 2 and less then 6, and/or the number of layers 47 in the quantum well structure is greater than 6, 7, or 8 and less than 30, 40, or 100. As the number of quantum wells 50 increases, the modulator structure of FIG. 4A may experience increased capacitance effects. As a result, the modulator structure of FIG. 4B may provide higher rates with increasing numbers of quantum wells 50.

The thickness of the wells 50 is labeled Tw and the thickness of the potential barriers 49 is labeled Tb in FIG. 4C. The thickness of the wells 50 can be the same or different from the thickness of the potential barriers 49. In some instances, the thickness of the wells 50 is greater than 2 nm, 6 nm, or 7 nm and less then 11 nm, 12 nm, or 30 nm and the thickness of the potential barriers 49 is greater than 2 nm, 9 nm, or 10 nm and/or less than 20 nm, 30 nm, or 100 nm. In one example, the thickness of the wells 50 is 9 nm and the thickness of the potential barriers 49 is 12 nm.

The thickness of the upper layer of electro-absorption medium 27 is labeled Tu and thickness of the lower layer of electro-absorption medium 27 is labeled Tl in FIG. 4A and FIG. 4B. The thickness for the upper layer of electro-absorption medium 27 (Tu) can be the same or different from the thickness for the lower layer of electro-absorption medium 27 (Tu). In some instances, the quantum well structure fills the entire ridge of the electro-absorption medium 27. Accordingly, the thickness for the upper layer of electro-absorption medium 27 (Tu) can be 0.0 and/or the thickness for the upper layer of electro-absorption medium 27 (Tu) can be 0.0. In some instances, a thickness for the upper layer of electro-absorption medium 27 (Tu) is greater than 1 μm and less than 1.5 μm and/or a thickness for the lower layer of electro-absorption medium 27 (Tl) is greater than 0.9 μm and less than 1.3 μm.

The inventors have found that the Quantum-Confined Stark Effect (QCSE) modulators constructed disclosed above can include a localized heater configured to heat all or a portion of the modulator. The temperature change can be used to tune the working wavelength of the modulator. The inventors have found that the Quantum-Confined Stark Effect (QCSE) modulators constructed as disclosed above can have a working wavelength shift rate of greater than 0.7 nm/° C.

The potential barriers 49 and the wells 50 can be formed by epitaxial growth processes such as a fast epitaxial growth process. In some instances, the upper layer of the electro-absorption medium 27 is also formed by epitaxial growth. However, the quality of the absorption (peak to value ratio) of the modulator is a function of the smoothness of the upper and lower surfaces of the potential barriers 49 and the wells 50. When the potential barriers 49 and the wells 50 are formed by a series of epitaxial growth processes, the smoothness of the surface of the seed layer upon which the first potential barrier 49 or well 50 (the upper surface of the lower layer of the electro-absorption medium 27 in FIG. 4A and/or FIG. 4B) is grown can affect the Extinction Ratio, the total absorption level, and the ratio of the absorption level: Extinction Ratio. The inventors have found that the smoothness of the upper surface of the seed layer is a strong function of the chamber pressure during epitaxial growth of the seed layer. For instance, the inventors have found that when the upper surface of the lower layer of the electro-absorption medium 27 is $Si_{0.3}Ge_{0.7}$ epitaxially grown at a pressure of 30, 40, and 50 Torr to a thickness of 300 nm, the root mean squared roughness is respectively 1.067, 0.953, and 0.82. Accordingly, the upper surface of the seed layer can have a root mean square roughness greater than 1.5 nm and less than 3 nm. The inventors have found that when the potential barriers 49 and wells 50 are epitaxially grown on the seed layer, the smoothness of the seed layer is carried or is essentially carried through the potential barriers 49 and wells 50 of the quantum well structure. For instance, the inventors have found that the root mean squared roughness of the potential barriers 49 and wells 50 increases as thickness is added to the quantum well structure. A suitable chamber pressure for growth of the seed layer, barriers 49 and wells 50 is greater than 10 Torr, or 20 Torr and/or less than 60 Torr, or 70 Torr. For instance, all or a portion of the wells 50 and potential barriers 49 can each be grown in a chamber at a pressure greater than 10 Torr, or 20 Torr and/or less than 60 Torr, or 70 Torr.

The above structure has not been previously created due to the belief that the diffusion of the Si and Ge in the quantum well structure in response to growth conditions would cause the quantum well structure to behave as the bulk structure with low levels of absorption. However, the inventors have surprisingly found that growth of the wells 50 and potential barriers 49 can be done such that the structure to retain the Si and Ge within the wells 50 and potential barriers 49. Suitable temperatures for growth of the quantum well structure include, temperatures greater than 300° C., or 400° C. and less than 700° C., or 800° C. For instance, all or a portion of the wells 50 and potential barriers 49 can each be grown in a chamber at temperatures greater than 300° C., or 400° C. and/or less than 700° C., or 800° C. As a result, the quantum well structure can be grown in a in a chamber at a pressure greater than 10 Torr, or 20 Torr and/or less than 60 Torr, or 70 Torr and a temperature greater than 300° C., or 400° C. and less than 700° C., or 800° C. Accordingly, all or a portion of the wells 50 and potential barriers 49 can each be grown in a chamber at a pressure greater than 10 Torr, or 20 Torr and/or less than 60 Torr, or 70 Torr and a temperature greater than 300° C., or 400° C. and less than 700° C., or 800° C. When these temperatures and/or pressures are used during the growth of a layer selected from a well 50 or potential barrier 49, the temperature and/or pressure in the chamber can be maintained during the growth of all or a portion of the layer.

The growth of the quantum well structure can be followed by annealing of the quantum well structure. The annealing can be done in one annealing period or can be done in two, three or more than three annealing periods separated by rest periods. During the annealing periods, the quantum well structure can be exposed to pressures greater 10 Torr, or 20 Torr and less than 60 Torr, or 70 Torr and/or temperatures greater than 600° C. or 700° C. and/or less than 800° C. or 900° C. for time periods greater than 10 min or 12 min and/or less than 18 min or 20 min. During the rest periods, the quantum well structure is exposed to ultra-high vacuum and/or temperatures greater than 300° C. or 400° C. and/or less than 700° C. or 800° C. for time periods greater than 1 min or 2 min and/or less than 14 min or 15 min.

Figure 5A:
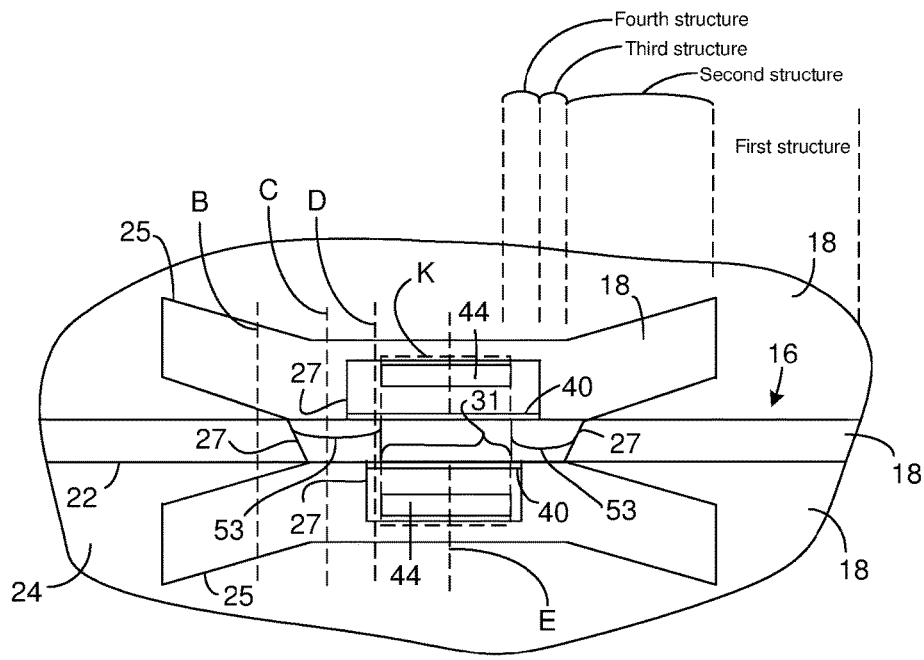
FIG. 5A through FIG. 5D illustrate the waveguide in the device of FIG. 2A through FIG. 2D modified to include transition portions.
Figure 5B:
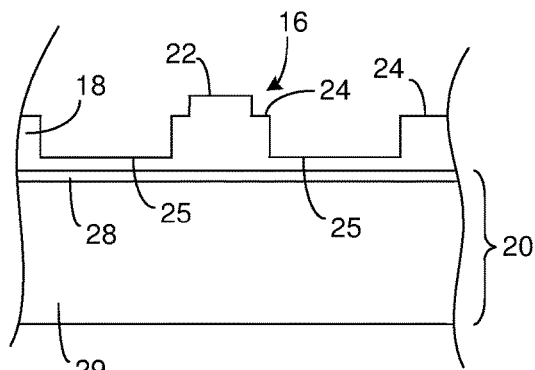
Figures 5C, 5D:
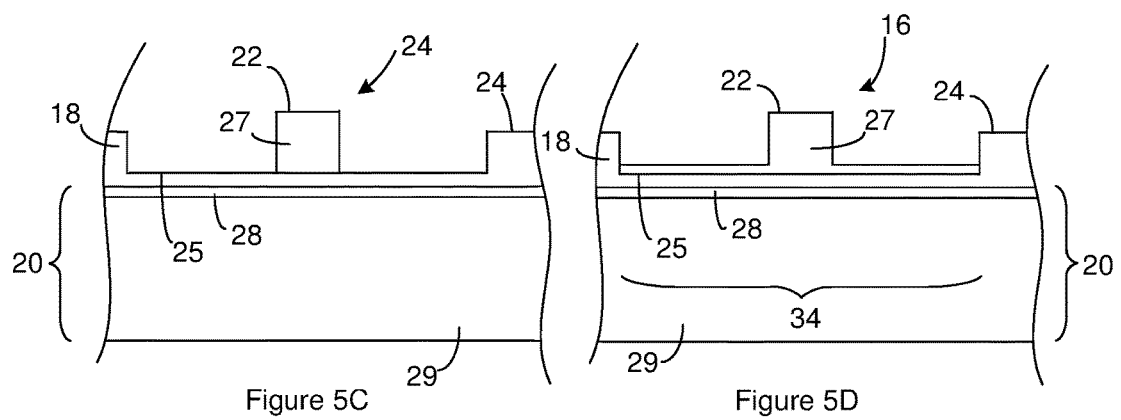

The waveguide can include one or more transition portions 53. For instance, FIG. 5A through FIG. 5D illustrate the waveguide in the device of FIG. 2A through FIG. 2D modified to include transition portions 53. FIG. 5A is a topview of the portion of an optical device that includes an optical modulator. FIG. 5B is a cross-section of the optical device shown in FIG. 5A taken along the line labeled B. FIG. 5C is a cross-section of the optical device shown in FIG. 5A taken along the line labeled C. FIG. 5D is a cross-section of the optical device shown in FIG. 5A taken along the line labeled D.

The device is modified such that the portions of the waveguide that have the third structure and the fourth structure include the electro-absorption media 27 in the ridge. For instance, the ridge 22 in FIG. 5C and FIG. 5D each includes the electro-absorption media 27. Although the electro-absorption medium 27 is shown as being positioned over the light-transmitting medium 18, the electro-absorption medium 27 can be in contact with the base. For instance, the transition portion 53 of the waveguide need not have light-transmitting medium 18 between the electro-absorption medium 27 and the base 20. The electro-absorption medium 27 included in the transition portions 53 can be continuous with the electro-absorption medium 27 included in the modulator.

FIG. 5A through FIG. 5D include the modulator located between the transition portions 53. The presence of the transition portions 53 can reduce reflections caused by the quantum well structure 31. While FIG. 5a through FIG. 5d illustrate the waveguide including multiple transition portions 53, the device can include a single transition portion.

A suitable length that a transition region extends away from the modulator includes, but is not limited to, a length greater than 50 µm, 80 µm, or 100 µm and/or less than 500 µm, 800 µm, or 1000 µm.

The location of a Quantum Well structure 31 shown in FIG. 5A. However, the modulator on the device of FIG. 5A through FIG. 5D can have any of the modulator structures disclosed above. Accordingly, the modulator on the device of FIG. 5A through FIG. 5D need not have a Quantum Well structure 31.

Although FIG. 5A through FIG. 5D illustrate the electro-absorption medium 27 included in the portion of the waveguide having the third structure and the fourth structure, the waveguide can have other configurations. For instance, the portion of the waveguide having the fourth structure can include the electro-absorption medium 27 while the portion of the waveguide having the third structure excludes the electro-absorption medium 27. Alternately, the electro-absorption medium 27 can be included in the portion of the waveguide having the second structure, the third structure and the fourth structure. Alternately, the electro-absorption medium 27 can be included in the portion of the waveguide having the first structure, the second structure, the third structure and the fourth structure.

Figure 6A:
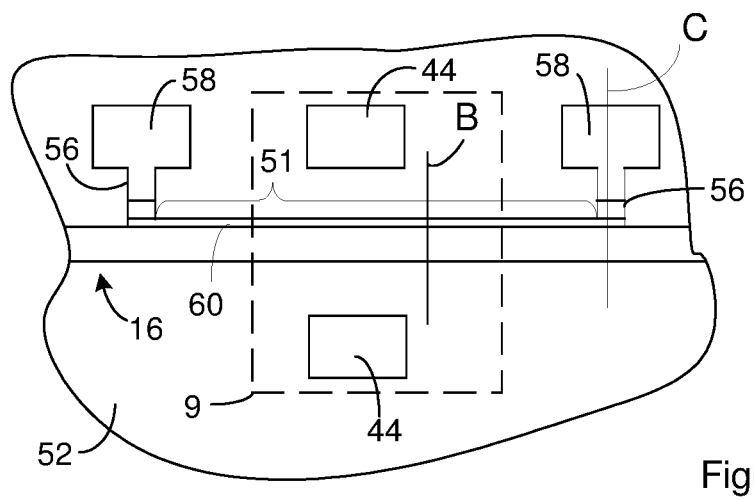
FIG. 6A through FIG. 6C illustrate a localized heater in conjunction with a modulator.
Figure 6B:
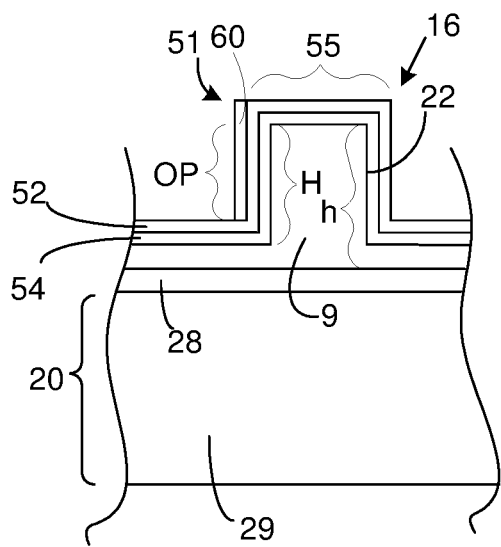
Figure 6C:
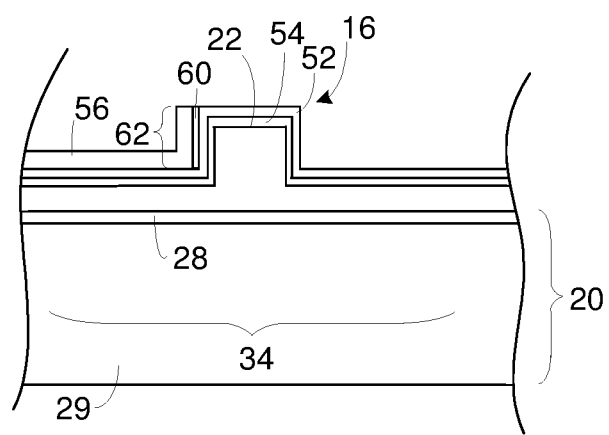

The localized heaters are not illustrated in FIG. 2A through FIG. 4C in order to illustrate the parts located under the heater. However, FIG. 6A through FIG. 6C illustrate the localized heater in conjunction with a modulator. The details of the modulator are not illustrated, but the modulator can be constructed according to FIG. 2E through FIG. 4C or can have another construction. FIG. 6A is a topview of the portion of the device that includes the modulator. FIG. 6B is a cross section of the modulator shown in FIG. 6A taken along the line labeled B in FIG. 6A. FIG. 6C is a cross section of the modulator shown in FIG. 6A taken along the longitudinal axis of the waveguide 16.

The heater 51 is on a lateral side the ridge 22 without extending over a top of the ridge 22. For instance, the heater 51 is positioned such that an imaginary line can be drawn perpendicular to a lateral side of the ridge 22 and extending through the heater 51. One or more layers of material can optionally be positioned between the heater 51 and the ridge 22. For instance, the heater 51 can be located on an insulating layer 52 that electrically insulates the heater from the underlying layers. The insulating layer 52 is positioned between the heater and the ridge 22. Suitable insulating layers 52 include, but are not limited to, silica and silicon nitride. An insulating layer with a higher thermal conductivity may be preferred in or to provide a pathway from heat to travel from the heater to the modulator. Accordingly, insulating layers 52 that are thinner and/or have a higher thermal conductivity may be desired. In some instances, the insulating layer 52 has a thermal conductivity above 10 W/mK.

One or more claddings 54 are optionally positioned between the waveguide 16 and the insulating layer 52 and/or between the waveguide 16 and the heater 51. At least one of the claddings 54 can directly contact the light-transmitting medium 18. A cladding that contacts light-transmitting medium 18 preferably has a lower index of refraction than the light-transmitting medium 18. When the light-transmitting medium 18 is silicon, suitable claddings include, but are not limited to, polymers, silica, SiN and $LiNbO_3$. In some instances, a single layer of material can serve as both a cladding 54 and an insulating layer 52. Although the insulating layer 52 is shown as a single layer of material, the insulating layer 52 can include or consist of multiple layers of material.

When one or more layers of material are positioned over the ridge 22, the one of more layers of material define a device ridge. For instance, the perimeter of the insulating layer 52 illustrated in FIG. 6B defines the perimeter of a device ridge 55. The device ridge includes the ridge 22 in that at least a portion of the ridge 22 is positioned within the device ridge. When one or more material layers are not positioned over the ridge 22, the ridge 22 serves as the device ridge 55. For instance, if the cladding 54 and insulating layer 52 were not present on the device of FIG. 6B, the ridge 22 would serve as the device ridge 55.

Conductors 56 are in electrical communication with the heater and are positioned so as to provide electrical communication between the heater 51 and contact pads 58. The conductors 56 and contact pads 58 can be electrically conducting. The conductors 56 can include a contact region 62 in electrical communication with the heater. As a result, the electronics 47 can apply electrical energy to the contact pads 58 so as to deliver electrical energy to the heater 51 and can accordingly operate the heater so the heater 51 generates heat. The location of the heater over the lateral side of the ridge 22 allows the generated heat to elevate the temperature of the ridge through a mechanism such as conduction.

In some instances, the heater 51 is an "electrical resistance heater." For instance, the heater 51 can include or consist of an electrically conducting layer 60 that serves as a resistor. The length of the ridge 22 that is heated by the heater can be changed by changing the length of the resistor. An example of a suitable resistor is a trace that includes or consists of a metal, metal alloy. Examples heaters include or consist of titanium traces, tungsten traces, titanium nitride, and nichrome traces. The contact regions 62 can be positioned over or under the conducting layer 60 and in contact with a contact portion of the conducting layer 60. During operation of the device, the electronics 47 can drive sufficient electrical current through the electrically conducting layer 60 to cause the electrically conducting layer 60 to generate the heat that is conducted to the modulator.

The electrically conducting layer 60 can have a higher resistance/length than the contact regions 62 and/or the conductors 56 in order to stop or reduce generation of heat by the conductors 56. This can be achieved by using different materials and/or dimensions for the conductors 56 and the conducting layer 60. For instance, the conductors 56 can be aluminum while the conducting layer 60 that serves as the heater is titanium. Titanium has a specific electrical resistance of about 55 µohm-cm while aluminum has a specific electrical resistance of about 2.7 µohm-cm. As a result, the conductors 56 and conducting layer 60 can have similar cross sectional dimensions and an electrical current can be driven through the conductors 56 and conducting layer such that heat is generated at the conducting layer without undesirable levels of heat being generated by the conductors 56. Alternately, the conductors 56 can have larger cross section dimensions than the heater in order to further reduce heat generation by the conductors 56

In some instances, the conductors 56 include a portion of the conducting layer 60 from the heater 51 in addition to the contact regions 62 as is evident in FIG. 6A. In these instances, the contact regions 62 can be more conductive and/or have larger dimensions than the conducting layer 60 in order to reduce generation of heat by the conductor 56. When the conductors 56 include the conducting layer 60 and the contact regions 62, the conductors 56 and heater can be formed by forming a first layer of the material for the conducting layer 60 and then forming a second layer of material for the conductors 56 over the first layer. Suitable methods for forming the first layer and the second layer on the device include, but are not limited to, sputtering, evaporation, PECVD and LPCVD. The first layer and the second layer can then be patterned so as to form the conductors 56 and conducting layer 60 on the device. Suitable methods for patterning include, but are not limited to, etching in the presence of one or more masks. The portion of the second layer over the heater 51 can then be removed to provide the configuration of conducting layer and conductive layer shown in FIG. 6A and FIG. 6C. Suitable methods for removing the portion of the second layer include, but are not limited to, etching in the presence of a mask. Although the electrically conducting layer 60 and conductors 56 are disclosed as a single layer of material, either or both of the conducting layer 60 and the conductors 56 can include or consist of one or more different layers of material.

Figure 7A:
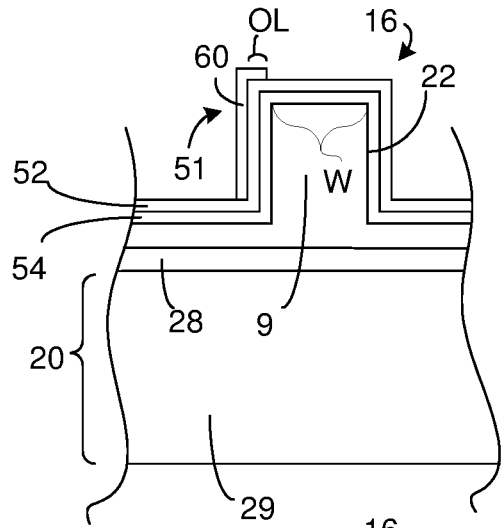
FIG. 7A is a cross section of a portion of a device that includes a heater on a modulator. The heater is positioned over a lateral side of the modulator and over a portion of a device ridge.

FIG. 6A through FIG. 6C illustrate the heater 51 as being positioned over a lateral side of the ridge without any portion of the heater being positioned above the upper exterior cornet of the device ridge. However, the heater can extend above an upper exterior corner of the device ridge without being position over the device ridge or can bend around the exterior corner of the device ridge so as to be positioned over the top of the ridge 22. For instance, FIG. 7A is a cross section of a device having a heater that bends around an exterior corner of the device ridge such that a portion of the heater is positioned over the top of the ridge 22. The heater can be positioned over the device ridge without being positioned over the modulator or can extend over the modulator. For instance, the heater can be positioned over the device ridge without extending over the ridge 22 of electro-absorption medium or can be positioned over the over the ridge 22 of electro-absorption medium. As discussed above, having a significant portion of the heater over the top of the ridge can pull the mode upwards in the ridge. As a result, it may be desirable to eliminate the portion of the heater from over the top of the ridge. Further, the portion of the heater over the top of the ridge may be an artifact of the fabrication process.

FIG. 7A illustrates the heater extending from an upper exterior corner of the device ridge to a lower interior corner at the base of the device ridge; however, the heater can be positioned over the lateral side without extending from an upper exterior corner to a lower interior corner. For instance, the heater 51 can be spaced apart from the upper exterior corner and/or lower interior corner.

Figure 7B:
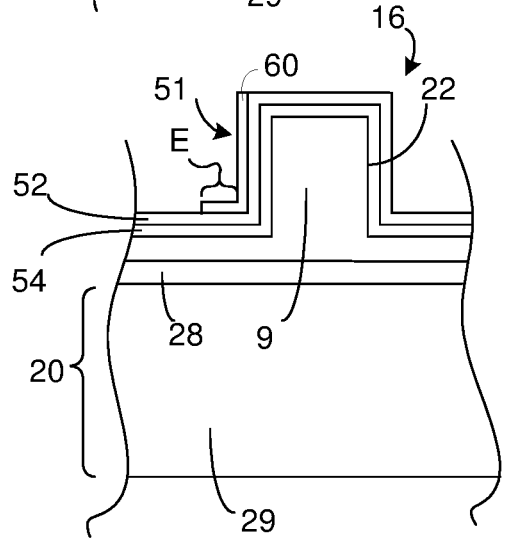
FIG. 7B is a cross section of a portion of a device that includes a heater on a modulator. The heater is positioned over a lateral side of the modulator.

In some instances, a portion of the heater extends away from the ridge 22 such that the heater 51 is positioned over the slab regions. For instance, FIG. 7B is a cross section of the modulator where the heater extends down to the lower interior corned of the device ridge and also extends away from the lower interior corner over a slab region. The heater has a first portion positioned over a lateral side of the ridge and a second portion that extends away from the first portion and is positioned over a slab region. The second portion can be formed such that an imaginary line can be drawn that is both perpendicular to the slab region and extending through the second portion without extending through the first portion. Additionally or alternately, an imaginary line can be drawn perpendicular to a lateral side of the ridge and extending through the first portion without extending through the second portion. The distance that the second portion of the heater extends away from the first portion of the heater is labeled E in FIG. 7B. The distance is equal to the distance between the edge of the heater and the portion of the heater on the lateral side of the ridge 22. Increasing the distance that the heater extends away from the device ridge can reduce the degree of localized heating and can increase the power requirements for the device. As a result, it is often desirable to minimize or eliminate the portion of the heater that extends away from the device ridge. Further, the portion of the heater that extends away from the device ridge may be an artifact of the fabrication process. In some instances, the distance that the heater extends away from the device ridge is 0 or is less than 2 µm, or 0.5 µm and can be 0 µm.

Figure 7C:
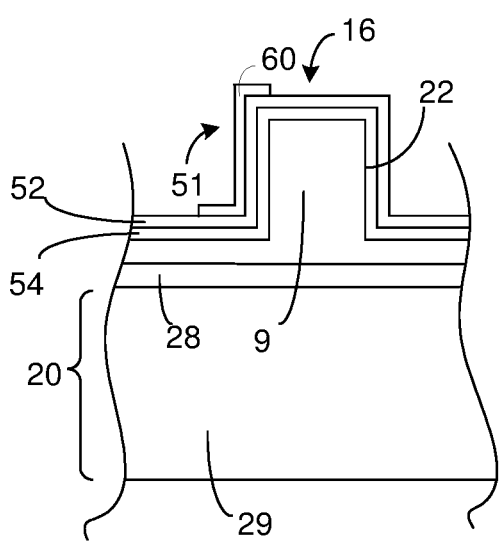
FIG. 7C is a cross section of a portion of a device that includes a heater on a modulator. The heater is positioned over a lateral side of the modulator, extends away from the lateral side, and is over a portion of a device ridge.

The heater configured to FIG. 7A and FIG. 7B can be combined. For instance, a portion of a heater 51 can be positioned over the top of the ridge 22 as disclosed in the context of FIG. 7A while another portion of the heater extends away from the ridge 22 as disclosed in the context of FIG. 7B. FIG. 7C illustrates an example of a device having a heater where a portion of the heater 51 is positioned over the top of the ridge 22 while another portion of the heater extends away from the ridge 22.

Figure 8A:
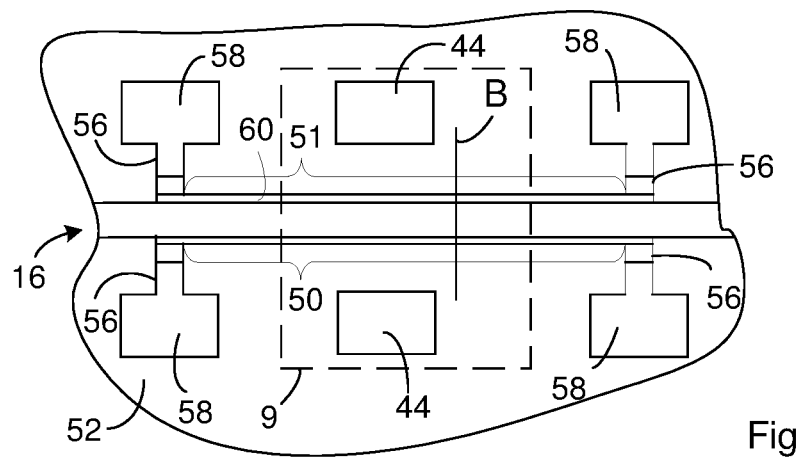
FIG. 8A and FIG. 8B illustrate a device having a modulator that includes heaters positioned over opposing lateral sides of a ridge.
Figure 8B:
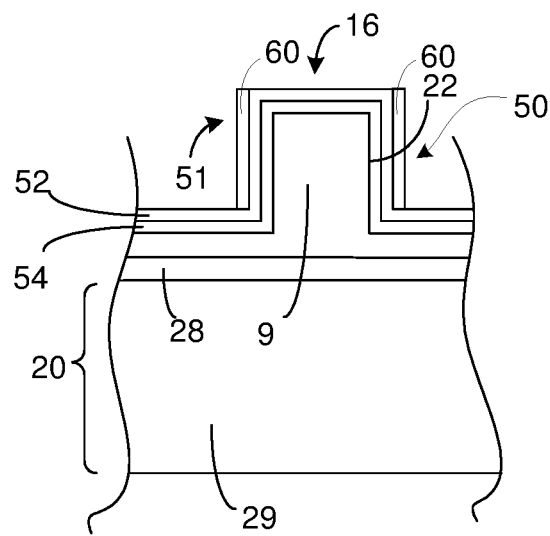

Although FIG. 6A through FIG. 7C illustrate the device having a single heater, the device can include multiple heaters. As an example, FIG. 8A and FIG. 8B illustrate a device having heaters over the lateral sides of the ridge. FIG. 8A is a topview of the portion of the device that includes a modulator. FIG. 8B is a cross section of the device shown in FIG. 8A taken along the line labeled B in FIG. 8A.

The heaters are positioned on opposing lateral sides of the ridge. For instance, a cross section taken perpendicular to the longitudinal axis of the waveguide extends through both of the heaters. Since the heaters are on opposing laterals sides, thermal energy from different heaters can heat the same region of the waveguide. The use of both heaters can further increase temperature uniformity within the waveguide but may form parasitic capacitance that can reduce RF performance and operation speed.

As is evident from FIG. 8A, each heater is in electrical communication with different contact pads 58. As a result, the electronics can independently operate the heaters. Alternately, the electronics can connect the heaters in parallel and/or series. Alternately, the device can include traces or other conductors that connect the heaters in parallel and/or series.

Although the heaters shown in FIG. 8A through FIG. 8B are constructed according to FIG. 6B, each of the heaters can be constructed according to any one of FIG. 6B and FIG. 7A through FIG. 7D. Additionally, the heaters need not have the same construction. For instance, one of the heaters can be constructed according to FIG. 7C while another heater is constructed according to FIG. 7A.

The portion of the heater vertically over the top of the device ridge in FIG. 7A is labeled OA in FIG. 7A. For instance, the portion of the heater labeled OA represents the portion of the heater that overlaps the modulator in FIG. 7A or that would be vertically projected onto the top of the modulator. The portion of a heater located over the ridge can be an artifact of the fabrication process. The width of the top of the modulator is labeled W in FIG. 7A. In some instances, W is less than 1.6 μm, 1.4 μm, or 1.2 μm and/or greater than 0.8 μm, 0.6 μm, or 0.4 μm. Since it can be desirable to reduce or eliminate the portion of a heater located over the top of the modulator, the percentage of the width of the top of the modulator covered by the heater (OA/W) can be 0 or less than less than 5%, 10%, or 15% at a particular location along the length of the modulator for a portion of the modulator length or the entire modulator length. When the device includes two heaters on opposing laterals sides of the ridge and one or more of the heaters is positioned over the modulator, the percentage of the width covered by the heaters can be 0 or less than 10%, 20%, or 30% at a particular location along the length of the modulator for a portion of the modulator length or the entire modulator length. Although the above overlap dimensions are disclosed in the context of a heater constructed according to FIG. 7A, these dimensions can apply to a heater constructed according to FIG. 7C and any other heater where a portion of the heater is located over a lateral side of the ridge.

The portion of the heater over a lateral side of the modulator in FIG. 6B is labeled OP. For instance, the portion of the heater labeled OP represents the portion of the heater that overlaps the lateral side modulator in FIG. 6B or that would be horizontally projected onto the lateral side of the modulator. The height of the lateral side of the modulator is labeled H in FIG. 6B. In some instances, the waveguide height is more than 0 μm, 2 μm, or 3 μm and/or less than 4 μm, 5 μm, or 6 μm. In some instances, the presence of an insulating layer 52 and/or cladding 54 between a slab region and the heater prevent the heater from being positioned over the entire height of the lateral side as is evident in FIG. 6B. However, it may be desirable to increase the portion of lateral side height that is covered by the heater in order to increase temperature uniformity. Accordingly, the heater can cover the portion of the lateral side extending from the upper corner of the ridge 22 to the base of the ridge 22, the base of the insulating layer 52 or the base of the cladding 54. In some instances, the percentage of the lateral side covered by the heater (OP/H) can be greater than 10%, or 5% and/or less than or equal to 90%, 100% at a particular location along the length of the modulator for a portion of the modulator length or the entire modulator length. These dimensions can be met with a heater that extends from an exterior corner to in interior corner or with a heater that is spaced apart from the interior corner and/or exterior corner. Although the above overlap dimensions are disclosed in the context of a heater constructed according to FIG. 6B, these dimensions can apply to a heater constructed according to FIG. 7A through FIG. 7C and any other heater where a portion of the heater is located over a lateral side of the ridge.

The waveguide height is labeled h in FIG. 6B. In some instances, the waveguide height is more than 1 μm, 2 μm, or 3 μm and/or less than 4 μm, 5 μm, or 6 μm. The height of the lateral side can be more than 70%, 80%%, or 95%% and/or less than 97%%, 98%%, or 99% of the waveguide height. Additionally or alternately, the heater can be positioned over more than 70%, 75%, or 80% and/or less than 90%, 95%, or 100% of the waveguide height at a particular location along the length of the modulator for a portion of the modulator length or the entire modulator length.

Moving the heater 51 closer to the ridge 22 reduces the distance over which the generated heat must be conducted in order to elevate the temperature of the modulator and can accordingly reduce the amount of heat that must be generated in order to achieve a particular temperature within the modulator. Reducing the thickness of the one or more layers of material between the heater and the ridge 22 can move the heater 51 closer to the ridge 22 or electro-absorption medium. For instance, reducing the thickness of the one or more claddings 54 and the one or more insulating layers 52 can move the heater 51 closer to the ridge 22 or electro-absorption medium. In some instances, all or a portion of the heater 51 is within 0.5 or 2 μm of the electro-absorption medium 27. In some instances, the heater 51 is arranged such that the heater 51 does not contact the device at a location that is more than 2 μm, 200 μm, or 500 μm away from the ridge 22.

Figure 9A:
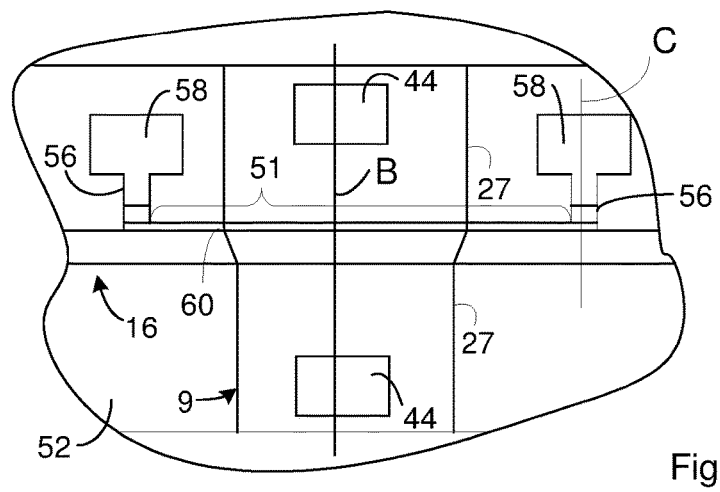
FIG. 9A and FIG. 9B illustrate the device of FIG. 6A through FIG. 6C in combination with the modulator of FIG. 2E.
Figure 9B:
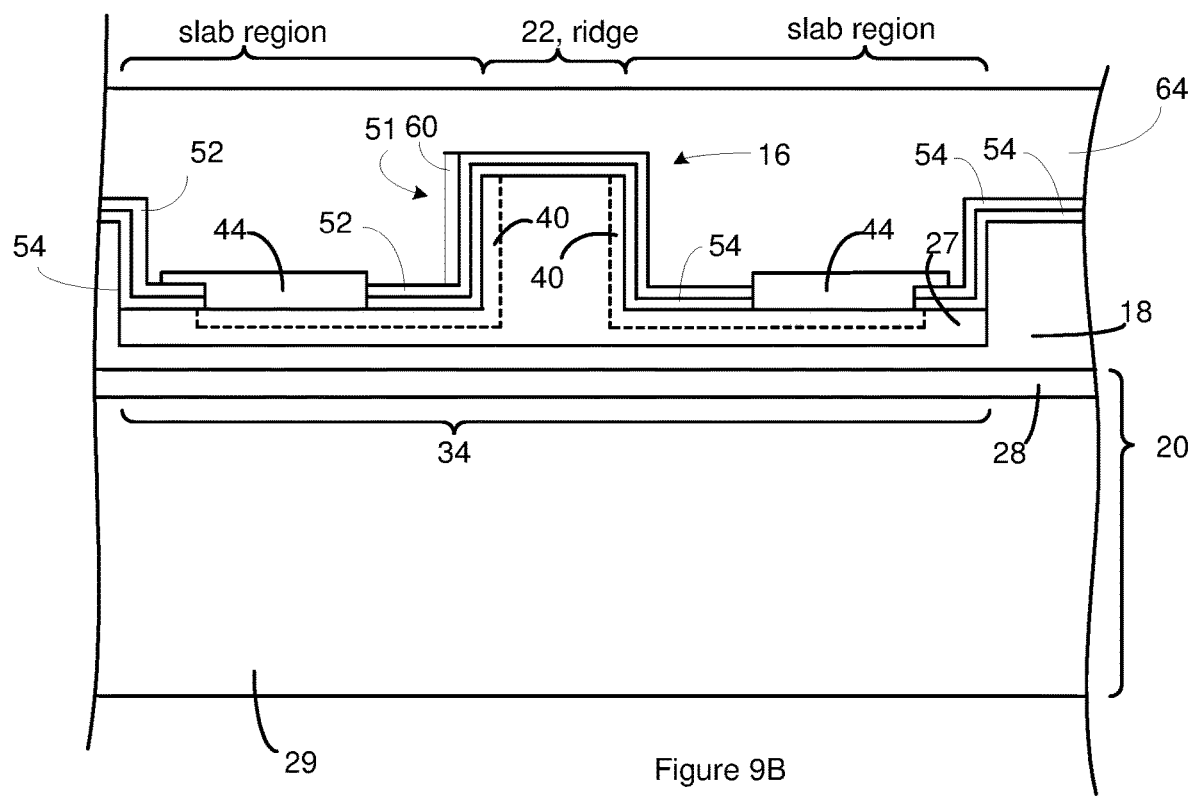

The details of the modulator construction are not illustrated in FIG. 6A through FIG. 8B; however, the modulator can have a variety of constructions including, but not limited to, the constructions of FIG. 2E through FIG. 4C. In order to illustrate this concept, FIG. 9A and FIG. 9B illustrate the device of FIG. 6A through FIG. 6C in combination with the modulator of FIG. 2E. FIG. 9A is a topview of the device. FIG. 9B is a cross section of the device shown in FIG. 9A taken along the line labeled B in FIG. 9A. The insulating layer 52 and cladding 54 are not shown in FIG. 9A in order to show the underlying features. FIG. 9A shows the heater 51 extending beyond the perimeter of the electro-absorption medium 27; however, one or both ends of the electro-absorption medium 27 can terminate over the electro-absorption medium 27.

As is evident in FIG. 9B, a protective layer 64 can optionally be formed over the above devices. In some instances, the protective layer 64 can have a thermal conductivity that is less than the thermal conductivity of the one or more claddings 54 and/or the one or more insulating layers 52. The reduced thermal conductivity of the protective layer 64 causes heat generated by the heater to be directed toward the modulator and can accordingly reduce the energy requirements of the heater as well as reduce thermal cross talk. Suitable protective layers include, but are no limited to, silica, silicon nitride, and aluminum oxide. Although the protective layer is disclosed as a single layer of material, the protective layer can be constructed of multiple layers of material. In some instances, one, two or three layers of the protective layer have a thermal conductivity greater than 0.75 WK/m, 1.0 WK/m, or 1.25 WK/m. The protective layer is not illustrated in FIG. 8B.

Figure 10A:
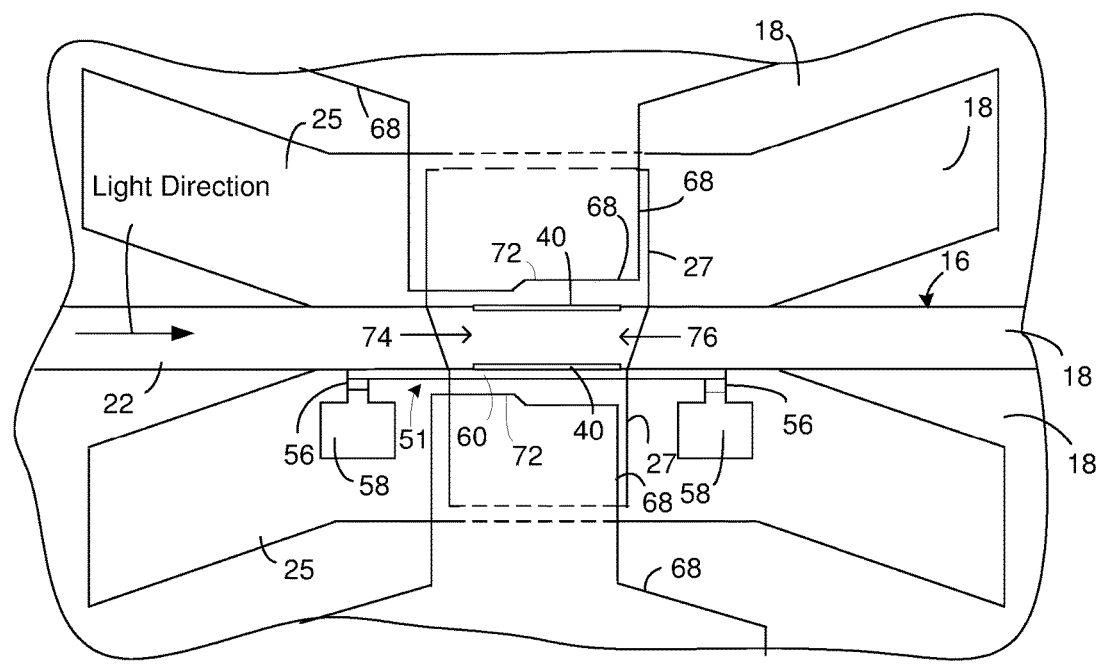
FIG. 10A is a topview of the device.
Figure 10B:
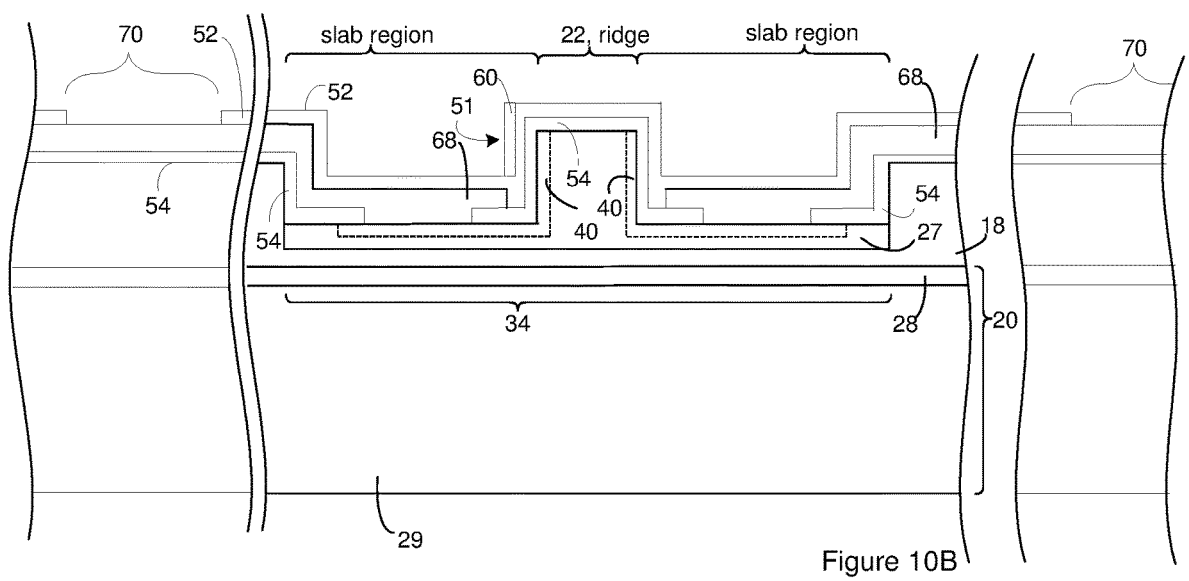
FIG. 10B is a cross section of the device shown in FIG. 10A taken along the line labeled B in FIG. 10A.

The above devices can optionally include one or more thermal conductors positioned so as to conduct thermal energy away from the ridge. The one or more thermal conductor can increase the uniformity of the temperature distribution along the ridge. The increased temperature uniformity allows higher power levels to be used with the modulator. FIG. 10A and FIG. 10B illustrate the device of FIG. 9A and FIG. 9B modified so as to include thermal conductors 68. Accordingly, the device is illustrated using the modulator of FIG. 2E as an example. FIG. 10A is a topview of the device. FIG. 10B is a cross section of the device shown in FIG. 10A taken along the line labeled B in FIG. 10A. The insulating layer 52 and cladding 54 are not shown in FIG. 10A in order to show the underlying features.

Conductors 68 are each positioned on a slab region. In the illustrated embodiment, at least a portion of each conductor is positioned on the slab regions of the electro-absorption medium 27. In FIG. 10A dashed lines are used to represent the perimeter of the electro-absorption medium 27 under the conductors 68 and also to illustrate the perimeter of the recesses 25 under the conductors 68. The conductors can be thermally conductive and, in some instances, are also electrically conducting.

In the illustrated example, the conductors 68 extend from over the electro-absorption medium 27 to a position over the light-transmitting medium 18. For instance, a first portion of each conductor 68 is positioned such that the electro-absorption medium 27 is between the conductor 68 and the base 20 and a second portion of the conductor 68 is positioned such that the electro-absorption medium 27 is not between the conductor 68 and the base 20. In some instances, the first portion of the conductor 68 is arranged such that a line can be drawn that is perpendicular to a surface of the conductor 68 and also extends through the electro-absorption medium 27 and in the second portion of the conductor 68, a line can be drawn that is perpendicular to same surface of the conductor 68 while extending through the light-transmitting medium 18 but not through the electro-absorption medium 27. Although a portion of a conductor 68 can be positioned in a recess 25, in some instances, at least a portion of the conductor 68 is located outside of the recess as is evident from FIG. 10A and FIG. 10B.

The one or more claddings 54 are optionally positioned between the conductors 68 and the base 20. In some instances, a cladding 54 is between one of the conductors 68 and a doped region 40. The claddings 54 can directly contact the light-transmitting medium 18. The insulating layer 52 can be located over the conductors 68. In some instances, a single layer of material can serve as both a cladding 54 and an insulating layer 52. Although the insulating layer 52 is shown as a single layer of material, the insulating layer 52 can include or consist of multiple layers of material.

The conductors 68 can be in electrical communication with a doped region. For instance, in some instances, the conductors are in direct physical contact with doped region 40. As an example, the conductors can extend through an opening in the material layer into contact with the underlying doped region as shown in FIG. 10B. The conductors can also be in electrical communication with contact pads 70. For instance, openings in the one or more layers of material can expose one or more portions of the conductors 68 that act as contact pads 70. The contact pads 70 can be in electrical communication with the electronics. The contact pads 70 can serve as the electrical conductors 44 disclosed in FIG. 2E, etc. Accordingly, when the conductors 68 are electrically conducting, one or more of the conductors 68 can provide electrical communication between the electronics and a doped region 40. In some instances, the conductors 68 are electrically conducting and the doped regions 40 are doped at a concentration that allows the doped regions 40 to act as electrical conductors. Accordingly, the conductors 68 and doped regions 40 provide an electrical pathway between the electronics and the ridge of electro-absorption medium 27. As a result, the electronics can apply energy to the electrical conductors 68 in order to apply an electric field to the electro-absorption medium 27 and operate the modulator.

During operation of the modulator, heat is generated as a result of the electro-absorption medium 27 absorbing light during the operation of the modulator. The label of "light direction" is used in FIG. 10A to indicate that the direction of propagation for light signals during operation of the modulator. The light signal enters the electro-absorption medium 27 through an input side of the electro-absorption medium 27 and exits from the electro-absorption medium 27 through an output side of the electro-absorption medium 27. Generally, the light absorption is most intense where the light signal first interacts with the electrical field. In general, this occurs at the interface of the light-transmitting medium 18 and the electro-absorption medium 27. As a result, light absorption is generally most intense at or near the input side of the electro-absorption medium 27. The increased light absorption can lead to a hot spot in the modulator. When the conductors are thermal conductors, the extension of the conductors 68 from over the electro-absorption medium 27, across the input side of the electro-absorption medium 27 to a location over the light-transmitting medium 18 provides a pathway for the heat generated by the modulator to be carried away from the modulator and accordingly provides cooling of the modulator.

The conductors 86 include an active edge 72 that is the edge of the conductors 86 located closest to the ridge 22. The modulation of the light signal primarily occurs where the electrical field is formed in the electro-absorption medium 27. Accordingly, the doped regions 40 define an entry side 74 and an exit side 76 for the modulator. The conductors 86 are constructed such that when moving from the entry side 74 to the exit side 76 for at least a portion of the conductor, the active edge 72 moves away from the ridge of the electro-absorption medium. More specifically, the distance between the active edge 72 and the ridge 22 increases moving from the entry side 74 to the exit side 76 for at least a portion of the active edge 72 where the distance is measured perpendicular to a lateral side of the ridge 22. As noted, heat is generated as a result of the electro-absorption medium 27 absorbing light during the operation of the modulator and is generally most intense where the light signal first interacts with the electrical field. As a result, the heat is generally generated most intensely near the entry side 74. The active edge 72 being closer to the ridge 22 at the entry side 74 results in a more efficient conduction of heat away from the ridge 22 near the entry side 74 than occurs further downstream of the entry side. The increased efficiency of heat conduction near the entry side 74 reduces the formation of hot spots at or near the entry side 74 of the modulator. The active edge 72 becoming further from the ridge downstream of the entry side results in a less efficient conduction of heat away from the ridge at locations downstream of the entry side 74. As a result, the heat provided by the heater 51 remains in the ridge 22 longer at locations downstream of the entry side 74 where less heat is generated as a result of absorption. By conducting heat away from the location where heat is generated by absorption but allowing heat from the heater to remain in the waveguide at locations where less heat is generated by absorption, the uniformity of the temperature along the length of modulator is increased. Increasing this uniformity allows the modulator to be operated at an efficient temperature.

In FIG. 10A, the active edge 72 of the conductors 86 extends past the entry side 74 of the modulator; however, the active edge 72 of the conductors 86 can terminate between the entry side 74 and the exit side 76. Extending the active edge 72 of the thermal conductors past the entry side 74 increases the area of the conductor 43 that is available for carrying heat away from the entry side 74 and may be the more desirable arrangement. Although FIG. 10A illustrates the active edge 72 terminating between the entry side 74 and the exit side 76 without extending past the exit side 76, the active edge 72 of the conductors 86 can extend past the exit side 76.

One or more of the conductors 86 can extend over the output side of the electro-absorption medium 27 and/or over the input side of the electro-absorption medium 27. This arrangement can increase the efficiency at which heat is conducted away from the entry side of the modulator.

The active edge 72 of each conductor illustrated in FIG. 10A includes two portions that are parallel or substantially parallel to the ridge 22 connected by a connecting portion; however, the active edge 72 can have other configurations constructed such that when moving from the entry side 74 to the exit side 76 for at least a portion of the conductor, the active edge 72 moves away from the ridge of the electro-absorption medium. For instance, the active edge can have a stair step configuration, one or more curved regions, and/or other configurations. More specifically, the distance between the active edge 72 and the ridge 22 can gradually increases moving from the entry side to the exit side where the distance is measured perpendicular to a lateral side of the ridge 22.

When the conductors 68 provides heat dissipation, the second portion of the conductors can have dimensions that exceed the dimensions that are commonly used for metal traces designed to carry electrical currents on integrated circuit boards. For instance, one or more of the conductors 68 can cover a portion of the device having an area more than 4,000 microns$^2$, 20,000 microns$^2$, or 100,000 microns$^2$ and/or a perimeter length greater than 300 microns, 500 microns, or 1000 microns. Additionally or alternately, one or more of the conductors can have a thickness greater than 50 picometers, 0.1 micron, or 1 micron. In some instances, the one or more of the conductors a thickness greater than 50 picometers, 0.1 micron, or 1 micron for more than 50% or 85% of the device area covered by the conductor. Although FIG. 10A illustrates the conductors 68 as having a somewhat regular shape, one or more of the conductors can have irregular shapes and/or patterns.

Although FIG. 10A and FIG. 10B illustrates the conductors 68 terminating before contacting the ridge, a portion of each one of the one or more conductors 68 can extend into contact with the ridge or with a vertical portion of the cladding 54.

Although the conductors 68 are disclosed as serving as the electrical conductors 44, the conductors need not serve as the electrical conductors 44. As a result, the conductors 68 need not be in electrical communication with the doped regions of the modulator.

Additional information regarding the use and construction of conductors 68 can be found in U.S. patent application Ser. No. 14/670,292; filed on Mar. 26, 2015; entitled "Control of Thermal Energy in Optical Devices;" and incorporated herein in its entirety.

Figure 11:
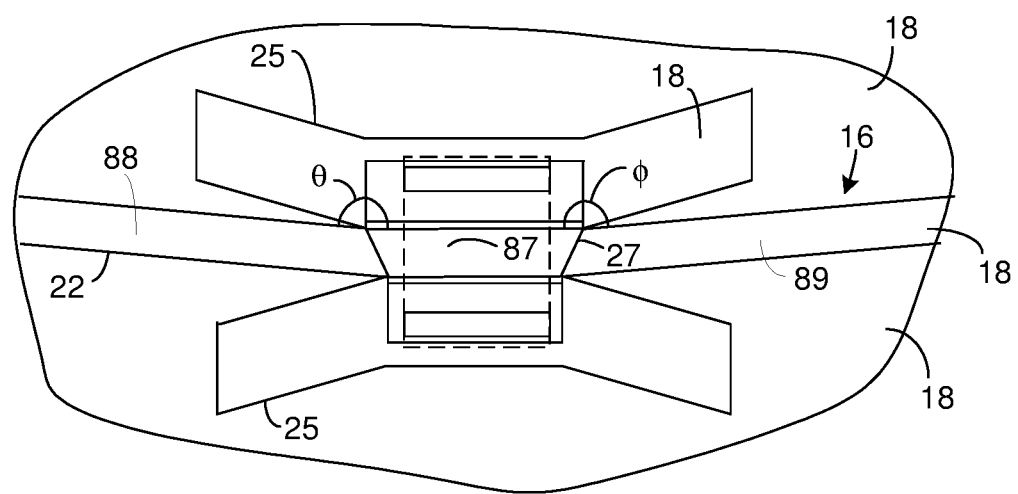
FIG. 11 shows the device of FIG. 2A modified such that an angle between a modulator portion of a waveguide and a first portion of the waveguide is less than 180° and an angle between the modulator portion of the waveguide and a second portion of the waveguide is less than 180°.

The waveguide in the above illustrations include a modulator portion between a first portion of the waveguide and a second portion of the waveguide. The above illustrations show a straight intersection between the first portion and the modulator portion and also between the second portion and the modulator portion. However, the waveguide portions in any of the above devices can intersect an angle other than 180° at one or both of these intersections. For instance, FIG. 11 shows the device of FIG. 2A modified such that an angle θ between a modulator portion 87 of the waveguide 16 and a first portion 88 of the waveguide 16 is less than 180° and an angle θ between the modulator portion 87 of the waveguide 16 and a second portion 89 of the waveguide 16 is less than 180°. The angle θ can be the same or different from the angle ϕ. The particular angle between the different portions of the waveguide can be selected to reduce optical loss from optical effects such as refraction. In some instances, the angle at one or both of these intersections is greater than 120°, 150°, 160°, or 170° and/or less than 175°, or 180°.

The modulators included in the devices of FIG. 6A through FIG. 11 can have constructions other than the constructions of FIG. 1A through FIG. 4C. For instance, the doped regions 40 disclosed above can be replaced by other filed sources such as metal electrical conductors. Additionally or alternately, the slab regions of the electro-absorption medium 27 can be removed by a process such as etching. Examples of other suitable modulator constructions can be found in U.S. patent application Ser. No. 12/653,547, filed on Dec. 15, 2009, entitled "Optical Device Having Modulator Employing Horizontal Electrical Field," and U.S. patent application Ser. No. 13/385,774, filed on Mar. 4, 2012, entitled "Integration of Components on Optical Device," each of which is incorporated herein in its entirety. U.S. patent application Ser. Nos. 12/653,547 and 13/385,774 also provide additional details about the fabrication, structure and operation of these modulators. In some instances, the modulator is constructed and operated as shown in U.S. patent application Ser. No. 11/146,898; filed on Jun. 7, 2005; entitled "High Speed Optical Phase Modulator," and now U.S. Pat. No. 7,394,948; or as disclosed in U.S. patent application Ser. No. 11/147,403; filed on Jun. 7, 2005; entitled "High Speed Optical Intensity Modulator," and now U.S. Pat. No. 7,394,949; or as disclosed in U.S. patent application Ser. No. 12/154,435; filed on May 21, 2008; entitled "High Speed Optical Phase Modulator," and now U.S. Pat. No. 7,652,630; or as disclosed in U.S. patent application Ser. No. 12/319,718; filed on Jan. 8, 2009; and entitled "High Speed Optical Modulator;" or as disclosed in U.S. patent application Ser. No. 12/928,076; filed on Dec. 1, 2010; and entitled "Ring Resonator with Wavelength Selectivity;" or as disclosed in U.S. patent application Ser. No. 12/228,671, filed on Aug. 13, 2008, and entitled "Electrooptic Silicon Modulator with Enhanced Bandwidth;" or as disclosed in U.S. patent application Ser. No. 12/660,149, filed on Feb. 19, 2010, and entitled "Reducing Optical Loss in Optical Modulator Using Depletion Region;" each of which is incorporated herein in its entirety.

Figure 12A:
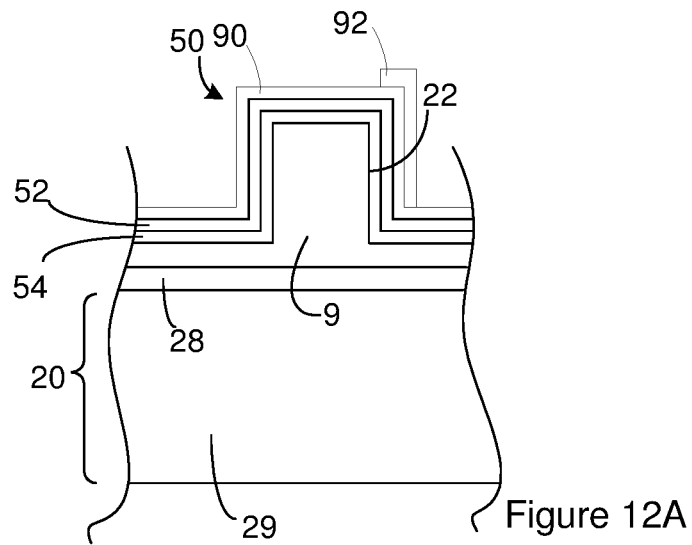
FIG. 12A is a cross section of a device precursor for use in fabricating a heater.

The heater 51, one or more insulating layers 52, one or more claddings 54, and conductors 56 can be fabricated using fabrication technologies that are employed in the fabrication of integrated circuits, optoelectronic circuits, and/or optical devices. FIG. 12A through FIG. 12F illustrate a variety of methods for fabricating the heater. The methods can be performed on a wafer such as a silicon-on-insulator wafer. A modulator can be formed on the wafer so as to provide a device precursor having the cross section illustrated in FIG. 12A. The one or more claddings 54 and one or more insulating layers 52 are formed over the modulator. A heater precursor 90 is formed over the one or more insulating layers 52. The heater precursor can be a layer of material that is the same as the material that is desired for the conducting layer 60 that serves as a resistive heater. For instance, if a titanium trace is to serve as a resistive heater, the heater precursor 90 can be a layer of titanium. A first mask 92 is formed so as to protect the region of the heater precursor 90 where the heater is to be formed. A suitable first mask includes, but is not limited to, a photoresist, silica, and silicon nitride. Photoresist formation techniques will generally form a photoresist that is wider than the thickness of the heater precursor 90. As a result, in some instances, the first mask will be positioned over the device ridge as shown in FIG. 12A.

Figure 12B:
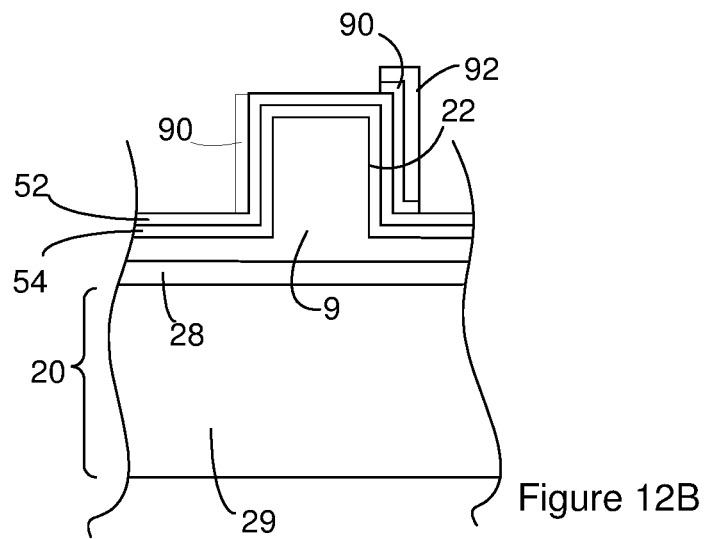
FIG. 12B illustrates the device precursor of FIG. 12A after a first etch.

A first etch is performed on the device precursor of FIG. 12A so as to provide the device precursor of FIG. 12B. A suitable first etch includes, but is not limited to, an anisotropic etch and/or a dry etch. When the etch direction is vertical, a portion of the heater precursor 90 that is not protected by the first mask 92 remains in place on the device ridge as shown in FIG. 12B.

Figure 12C:
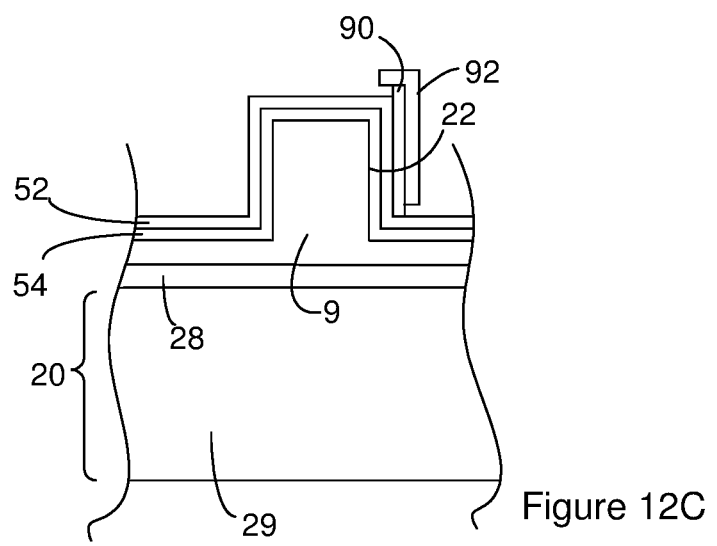
FIG. 12C illustrates the device precursor of FIG. 12B after a second etch.

A second etch can be performed on the device precursor of FIG. 12B so as to provide the device precursor of FIG. 12C. A suitable second etch includes, but is not limited to, an isotropic and/or a wet etch that removes the portion of the heater precursor 90 that is not protected by the first mask 92. Additionally, an isotropic and/or a wet etch undercuts the first mask as shown in FIG. 12C. The second etch can be performed for a duration that is sufficient for the second etch to undercut the first mask 92 until the portion of the heater precursor 90 located over the device ridge is removed.

Figure 12D:
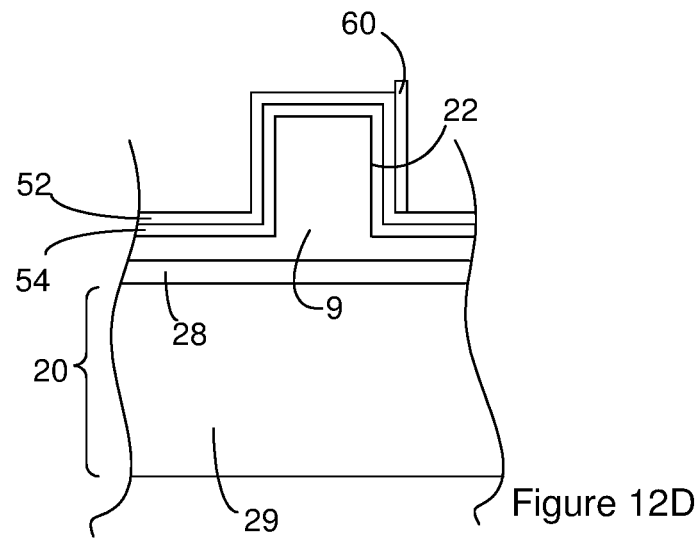
FIG. 12D illustrates the device precursor of FIG. 12C after removal of a mask from the device precursor of FIG. 12C.

The first mask 92 can be removed from the device precursor of FIG. 12C so as to provide the device of FIG. 12D. The portion of the heater precursor 90 that remains on the device serves as the heater 51. As shown in FIG. 12D, it is possible for the heater to extend past a corner of the device ridge without being positioned over the top of the device ridge.

An alternative method can start with the device precursor of FIG. 12B. For instance, the first mask 92 of FIG. 12B can be removed and a second mask formed on the resulting device precursor so as to provide the device precursor of FIG. 12E. The second mask 94 protects the same portion of the heater precursor 90 that was protected by the first mask 92 but the second mask 94 protects the edges of the heater precursor 90 rather than protecting only the top of the heater precursor 90. A suitable second mask 94 includes, but is not limited to, a photoresist, silica, and silicon nitride.

Figure 12E:
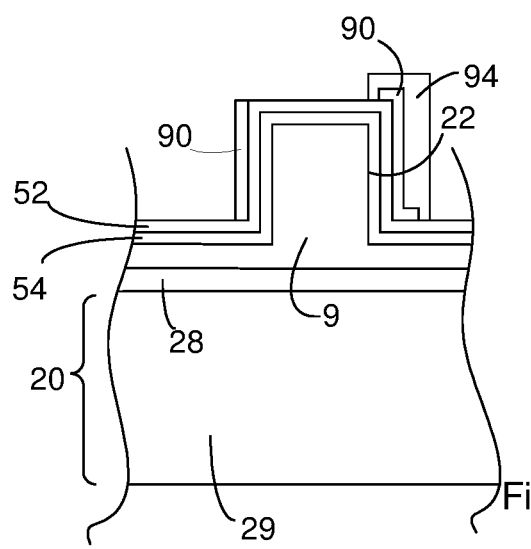
FIG. 12E illustrates the device precursor of FIG. 12B after removal of a first mask and the formation of a second mask.

A third etch can be performed on the device precursor of FIG. 12E and the second mask 94 removed so as to provide constructed according to precursor of FIG. 7C. A suitable third etch includes, but is not limited to, an isotropic and/or a wet etch that removes the portion of the heater precursor 90 that is not protected by the second mask 94. The edges of the resulting heater are well-defined, however, the method can result in a portion of the heater being located over the device ridge and/or extending away from the base of the device ridge.

The methods of FIG. 12A through FIG. 12E are easily adapted to form heaters on opposing sides of the ridge. For instance, heaters on opposing sides of the ridge and constructed according to FIG. 6B can be generated by performing the first etch without the first mask. Alternately, heaters constructed according to FIG. 12D can be generated by forming the first mask formed so as to protect each location where one of the heaters will be formed and performing the first etch followed by the second etch. Alternately, heaters can be generated on opposing lateral sides of the by forming the first mask formed so as to protect each location where one of the heaters will be formed and performing the first etch. The first mask can be removed and the second mask can be formed over the remaining heater precursor as described above. The third etch can then be performed and the second mask removed so as to provide heaters constructed according to FIG. 7C.

The device can include one or more temperature sensors (not shown) that are each positioned to sense the temperature of the modulator and/or the temperature of a zone adjacent to the modulator. Suitable temperature sensors include, but are not limited to, thermocouples, thermistors, integrated PN diodes, or other integrated semiconductor devices. The electronics can adjust the level of electrical energy applied to the heater in response to the output received from the one or more temperature sensors in a feedback loop. For instance, the electronics can operate the heater such that the temperature of the heater stays at or above a threshold temperature ($T_{th}$) during operation of the device. For instance, when the electronics determine that the temperature of the modulator falls below the threshold temperature, the electronics can apply electrical energy to the heater so as to bring the temperature of the modulator to or above the threshold temperature. However, when the electronics determine that the temperature of the modulator falls above the threshold temperature, the electronics can refrain from applying the electrical energy to the heater. As a result, when the electronics determine that the temperature of the modulator is above the threshold temperature, the temperature of the modulator can float in response to the operation of the device in the ambient atmosphere.

Although the heater is disclosed as being positioned on the ridge of a modulator, the heater can be positioned on the ridge of other optical components such as light sensors and light sources such as are disclosed in U.S. patent application Ser. No. 13/506,629.

Example 1

A Quantum-Confined Stark Effect (QCSE) modulator was constructed according to FIG. 4A and FIG. 4A and FIG. 4C. An electro-absorption medium of $Si_{0.26}Ge_{0.74}$ was epitaxially grown to a thickness of 1150 nm on the silicon light-transmitting medium of a silicon-on-insulator wafer in a chamber at a pressure of 50 Torr and a chamber temperature of 500° C. The upper surface of the resulting $Si_{0.26}Ge_{0.74}$ had a root mean square roughness of about 1 nm. The $Si_{0.26}Ge_{0.74}$ was used as a seed layer for epitaxial growth of a $Si_{0.26}Ge_{0.74}$ potential barriers. Quantum wells of Ge and potential barriers of $Si_{0.4}Ge_{0.6}$ were grown on the result in an alternating pattern so as to form a quantum well structure with 10 layers that each included four sub-layers. The wells were grown to a thickness of 9 nm and the potential barriers were grown to a thickness of 12 nm. The uppermost layer of the quantum well structure was a potential barrier of $Si_{0.4}Ge_{0.6}$. A layer of $Si_{0.26}Ge_{0.74}$ was grown to a thickness of 1328 nm on the quantum well structure to serve as the upper layer of electro-absorption medium 27. The upper surface of the upper layer of $Si_{0.26}Ge_{0.74}$ had a root mean square roughness of about 2 nm. The result was annealed in three annealing periods separated by rest periods. During the annealing periods, the quantum well structure was exposed to a temperature of 900° C. for 15 minutes. During the rest periods, the quantum well structure was exposed to ultra-high vacuum and temperature of 500° C. for 1 minute. The resulting modulator had a working wavelength shift rate of 0.83 nm/° C.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:
1. An optical device, comprising:
a waveguide positioned on a base and a modulator positioned on the base,
the modulator including a ridge that includes $Si_{1-x}Ge_x$ where x is greater than or equal to 0.4 and less than or equal to 0.8,
the modulator configured to guide a light signal through the modulator such that the light signal contacts the $Si_{1-x}Ge_x$; and a device ridge that includes the ridge, the device ridge having a top side and lateral sides, the lateral sides being between the top side and the base, and the top side having a width; and a heater positioned over one of the lateral sides and the top side of the device ridge without being positioned over the entire width of the top side.

2. The device of claim 1, wherein the modulator is a Quantum-Confined Stark Effect (QCSE) electro-absorption modulator configured to use the Quantum-Confined Stark Effect to modulate light signals.

3. The device of claim 1, wherein the ridge includes a quantum well structure that includes the $Si_{1-x}Ge_x$.

4. The device of claim 3, wherein the quantum well structure includes potential barriers alternated with quantum wells.

5. The device of claim 4, wherein the potential barriers include the $Si_{1-x}Ge_x$.

6. The device of claim 5, wherein the quantum wells are $Ge_ySi_x$ where $0.9 \leq y \leq 1.0$ and $0.1 \leq x \leq 0.0$.

7. The device of claim 6, wherein a height of the modulator is less than 5 µm.

8. The device of claim 3, wherein the quantum well structure includes multiple layers that each have the same chemical composition.

9. The device of claim 3, wherein the quantum well structure contacts a seed layer and a root mean square roughness of a surface between the quantum well structure and the seed layer is less than 1 nm.

10. An optical device, comprising:
a waveguide positioned on a base and a modulator positioned on the base,
the modulator being a Quantum-Confined Stark Effect (QCSE) electro-absorption modulator and including a ridge that includes $Si_{1-x}Ge_x$ where x is greater than or equal to 0.4 and less than or equal to 0.8,
the modulator configured to guide a light signal through the modulator such that the light signal contacts the $Si_{1-x}Ge_x$.

11. The device of claim 10, wherein the ridge includes a quantum well structure that includes the $Si_{1-x}Ge_x$.

12. The device of claim 11, wherein the quantum well structure includes potential barriers alternated with quantum wells.

13. The device of claim 12, wherein the potential barriers include the $Si_{1-x}Ge_x$.

14. The device of claim 13, wherein the quantum wells are $Ge_ySi_x$ where $0.9 \leq y \leq 1.0$ and $0.1 \leq x \leq 0.0$.

15. The device of claim 10, wherein a height of the modulator is less than 5 µm.

16. The device of claim 10, wherein the light signal has a wavelength of in a range of 1250 nm to 1350 nm.

17. A method of fabricating a modulator, comprising:
growing a seed layer on a base such that a surface of the seed layer has a root mean square roughness less than 1 nm; and
growing a quantum well structure on the surface of the seed layer, the quantum well structure including $Si_{1-x}Ge_x$ where x is greater than or equal to 0.4 and less than or equal to 0.8.

18. The method of claim 17, wherein a portion of the quantum well structure that contacts the surface is epitaxially grown in a chamber at a pressure of 20 to 60 Torr and at a temperature of 500 to 900 degrees.

19. The method of claim 17, wherein the quantum well structure alternates wells with potential barriers, the wells being Ge and the potential barriers including the $Si_{1-x}Ge_x$.

* * * * *